US011763227B2

(12) United States Patent
Karlson

(10) Patent No.: US 11,763,227 B2
(45) Date of Patent: *Sep. 19, 2023

(54) REMINDER SYSTEM

(71) Applicant: DOCSOF, LLC, Mission, KS (US)

(72) Inventor: Bruce Karlson, Mission, KS (US)

(73) Assignee: DOCSOF, LLC, Mission, KS (US)

( * ) Notice: Subject to any disclaimer, the term of this patent is extended or adjusted under 35 U.S.C. 154(b) by 743 days.

This patent is subject to a terminal disclaimer.

(21) Appl. No.: 15/785,102

(22) Filed: Oct. 16, 2017

(65) Prior Publication Data

US 2018/0039926 A1 Feb. 8, 2018

Related U.S. Application Data

(63) Continuation of application No. 14/798,149, filed on Jul. 13, 2015, now Pat. No. 9,792,570, which is a
(Continued)

(51) Int. Cl.
| | |
|---|---|
| *G06Q 10/06* | (2012.01) |
| *H04L 12/58* | (2006.01) |
| *G06F 16/2455* | (2019.01) |
| *G06Q 10/10* | (2012.01) |
| *G06Q 10/0631* | (2023.01) |
| *H04L 51/046* | (2022.01) |

(Continued)

(52) U.S. Cl.
CPC ... *G06Q 10/06316* (2013.01); *G06F 16/2455* (2019.01); *G06Q 10/06314* (2013.01); *G06Q 10/109* (2013.01); *H04L 51/046* (2013.01); *H04L 51/224* (2022.05)

(58) Field of Classification Search
CPC .................. G06F 17/24; G06Q 10/109; G06Q 10/06316; H04L 51/046
USPC .................................. 715/762–765, 851–854
See application file for complete search history.

(56) References Cited

U.S. PATENT DOCUMENTS 6,049,776 A * 4/2000 Donnelly ....... G06Q 10/063112
705/7.14
6,678,698 B2 * 1/2004 Fredell ................... G06Q 10/06
707/608
(Continued)

OTHER PUBLICATIONS

"Corrected Notice of Allowance received for U.S. Appl. No. 13/753,340 dated May 27, 2015".
(Continued)

*Primary Examiner* — Cao H Nguyen
(74) *Attorney, Agent, or Firm* — Kutak Rock LLP

(57) ABSTRACT

A reminder system is provided. The system provides a user-friendly interface to a user's existing email, and in some embodiments to the user's document management, calendar and other systems, in order to ensure that an appropriate user is notified when action should be taken, and also provides notation to the user indicating the appropriate course of action to be taken. The system provides a calendaring feature where a supervisor or manager can determine the workload of a group of workers for an upcoming time period. The system provides an easily accessible and traceable database of information pertaining to a project checklist, document, a client name, a client matter number, a document type, or other customizable fields in order for a user to search and sort the information for their own use.

13 Claims, 22 Drawing Sheets

Related U.S. Application Data continuation of application No. 13/753,340, filed on Jan. 29, 2013, now Pat. No. 9,083,663, which is a continuation-in-part of application No. 11/671,429, filed on Feb. 5, 2007, now Pat. No. 8,365,080.

(60) Provisional application No. 60/764,845, filed on Feb. 4, 2006.

(51) Int. Cl.
*G06Q 10/109* (2023.01)
*H04L 51/224* (2022.01)

(56) References Cited

U.S. PATENT DOCUMENTS

| | | | |
|---|---|---|---|
| 8,365,080 B2 | 1/2013 | Karlson | |
| 9,083,663 B2 | 7/2015 | Karlson | |
| 9,792,570 B2 | 10/2017 | Karlson | |
| 2002/0082857 A1 | 6/2002 | Skordin et al. | |
| 2004/0044556 A1* | 3/2004 | Brady | G06Q 10/0639 |
| | | | 705/7.13 |
| 2005/0033622 A1* | 2/2005 | Kuo | G06Q 10/109 |
| | | | 380/239 |
| 2005/0102607 A1* | 5/2005 | Rousselle | G06Q 10/109 |
| | | | 715/234 |
| 2007/0192423 A1 | 8/2007 | Karlson | |
| 2013/0212197 A1 | 8/2013 | Karlson | |
| 2015/0317590 A1 | 11/2015 | Karlson | |

OTHER PUBLICATIONS

"Final office action received for U.S. Appl. No. 11/671,429 dated Jan. 5, 2010".

"Final office action received for U.S. Appl. No. 13/753,340 dated Aug. 13, 2014".

"Final office action received for U.S. Appl. No. 14/798,149 dated Nov. 14, 2016".

"Non-Final office action received for U.S. Appl. No. 11/671,429 dated Apr. 2, 2009".

"Non-Final office action received for U.S. Appl. No. 11/671,429 dated Feb. 24, 2012".

"Non-Final office action received for U.S. Appl. No. 13/753,340 dated Jan. 15, 2014".

"Non-Final office action received for U.S. Appl. No. 14/798,149 dated Feb. 11, 2016".

"Notice of Allowance Received for U.S. Appl. No. 14/798,149 dated Jun. 13, 2017."

"Notice of Allowance received for U.S. Appl. No. 11/671,429 dated Sep. 26, 2012".

"Notice of Allowance received for U.S. Appl. No. 13/753,340 dated Mar. 9, 2015".

* cited by examiner

From: docmailer@wordtech.com [mailto:docmailer@wordtech.com]
Sent: Friday, February 02, 2007 9:07 AM
To: Bruce L. Karlson
Cc: Gary Walker
Subject: DocMinder - a document is due: Joint Venture Agreement (85246)

DOCSKC-#85246-v2
-Joint_Venture_Agree

DocMinder Notification

When task is completed hit reply and type complete, then hit send.

Document Name:   Joint Venture Agreement (85246)
Client Name:   ADVANCE STORES COMPANY, INC.
Client ID:   ADVAS
Matter Name:   Johnson Contract
Matter ID:   2
Library:  docskc
Entered By:  BLK
To:  BLK
Status:  Pending
Due Date:   2/2/2007
COMMENTS:   Check: 4.01 Profits and Losses new formula, also review all items on real estate closing
Closing Checklist

Executed Participation Agreement
 Executed Loan Documents
 Evidence of issuance of Bonds
 Executed Architect and Construction Contracts
 Plans and Specifications
 Appraisal
 Evidence of completion of environmental remediation work
 Evidence of insurance coverage
 Evidence of performance bond
 Evidence of zoning and issuance of construction permits
 Bond counsel opinion letter
 Borrower counsel opinion letter
 Executed Bond Documents

*Confidential*

REMINDER SYSTEM

This application is a continuation of U.S. patent application Ser. No. 14/798,149 filed Jul. 13, 2015, now U.S. Pat. No. 9,792,570, which is a continuation of U.S. patent application Ser. No. 13/753,340 filed Jan. 29, 2013, now U.S. Pat. No. 9,083,663, which is a continuation-in-part of U.S. patent application Ser. No. 11/671,429 filed Feb. 5, 2007, now U.S. Pat. No. 8,365,080, which claims priority to U.S. Provisional Patent Application Ser. No. 60/764,845 filed Feb. 4, 2006, the entire disclosures of which are incorporated herein by reference.

FIELD OF THE INVENTION

The present invention relates generally to a reminder system. More specifically, the present invention is concerned with a reminder system that coordinates with a messaging system and, in some embodiments other various systems (e.g. a document management system, network drive, MS SharePoint, etc.) such that an appropriate user is notified when action (or "task") items for a checklist, a document, a client or a project are needed.

BACKGROUND OF THE INVENTION

In a modern business environment, proper management of checklists and relevant due dates is essential to success. It is a common practice for individuals to type a list of tasks for a project and delegate that list to others. The list is emailed to others and the individual who delegated the work must remember to follow up and get current progress updates until closure is reached on all tasks. They may need to confirm the work was done properly, review related documents and email conversations. Reviewing 50, 100, etc. separate emails to keep everything straight and hitting deadlines without things falling through the cracks is a difficult and laborious task. Critical dates and important commitments inevitably fall through the cracks when common e-mail and physical follow up are the only methods of delegation and closure.

It would be beneficial to provide a reminder system that seamlessly interfaces with a user's existing email or messaging system, and in some embodiments document management system, calendar (tickler) system and other software, to provide a simple and effective means of generating reminders, prompting users, tracking responses to the reminders (if any), and furnishing meaningful information about task due dates, events, documents, etc., all within a matter of seconds through common email.

When users are responsible for an action item for a checklist, for example establishing a phone number for a new employee hire, they will often put that task in the user's personal calendar system, either an electronic or paper calendar. When the users are looking at their calendars, they are able to determine what their workload for an upcoming time period is and what action items need to be taken; however, usually, no other person in the group or even a supervisor has the ability to look at that person's calendar to determine what the upcoming action items are. Even if a supervisor can look at a person's individual calendar the supervisor will also see (and have to filter out) that person's personal events, such as social engagements, birthdays, and medical appointments. Additionally, in order to have an understanding for what an entire group is responsible for (particularly when a checklist involving multiple tasks handled by a number of different persons, such as in the case of a checklist to prepare for a new employee hire), a supervisor would have to integrate many personal calendars. Even if this could be done, which could be problematic, especially for those who insist upon using paper calendars, the integrated or merged calendar would be littered with personal information, and wading through this irrelevant information can be both time consuming and overwhelming to the supervisor. It would therefore be beneficial to provide a reminder system that allows a supervisor to access a calendar which outlines all action items for each project or task list, or for each individual in the group and/or the group as a whole, without extraneous personal items. It would also be beneficial to provide a reminder system where a supervisor accesses one master calendar that has all action items for a particular group of individuals or a particular project or task checklist and that can be easily sorted by various fields such as dates, clients, matters, responsible party, department, task description and so on.

Another problem of relying, as most businesses do today, on personal calendars is that when the person leaves the organization, the reminders, in many instances, leave too. Even if calendar dates are somehow preserved, the cryptic personal notes the departed employee left behind in his/her calendar may be impossible to interpret. As a consequence, the calendared event may pass without a response or the necessary action being taken. Therefore, it would be beneficial to provide a reminder system where the responsibility for action items can be centrally reviewed and be easily transferred from one user to another.

SUMMARY OF THE INVENTION

An object of the instant inventive concept is to provide a reminder system. Another object of the instant inventive concept is to provide a reminder system that is easy to use. Another object of the instant inventive concept is to provide a reminder system that is easy to use and which provides increased usability over conventional systems. Another object of the instant inventive concept is to provide a user-friendly interface to a user's existing email or messaging system (and in some embodiments document management, calendar, and/or other systems) in order to ensure that an appropriate user is notified when action or actions should be taken, is furnished with an automatic verification of task completion, and is furnished with a project task list with respect to the specific action item. Another object of the inventive concept is to provide an easy and fast way for a supervisor or manager to determine the workload of a group of workers for an upcoming time period, determine status of tasks related to a specific checklist or checklists, status of tasks assigned to a particular individual, etc. Still another object of the inventive concept is to provide an easily accessible and traceable database of information pertaining to a task checklist, a client, or other fields in order for a user to search and sort the information for their own use and in order for management, and others, to verify that tasks have been completed.

Embodiments of the present inventive concept comprise systems and methods of managing reminders and/or reminder checklists that allow an individual to create a list of tasks, or select an existing template, and delegate them to others faster and more efficiently than they can currently create a list in conventional email, Word, Excel, etc. Once a checklist is activated, the system of an embodiment of the inventive concept will automatically deliver the list to the recipients' e-mail inbox and follow up with preset notifications and escalations until there is closure on the entire project. Emails or documents can be added to the project from an email inbox, a common network drive, MS SharePoint, or a document management system.

Through common email reminders, in some embodiments, and a link to the reminder system of the inventive concept, individuals can post progress notes, complete tasks (which also posts their name and the date/time of completion) as well as add relevant documents to the project. The individual heading up the project can be automatically notified of any progress through email, or they can track progress from a centralized calendar of the reminder system and reporting module. Embodiments of the reporting and calendar allow a user to drill into a project and see who needs to do what and when, what remains to be completed, as well as all related documents, e-mails, conversations, etc. All team members are able to see the current status of the entire project to cut down on meetings. The objective is to see a summary of all work in one email, or report, rather than managing many individual emails by all the parties and then creating a separate document for reporting purposes.

In some embodiments the reminder system of the instant invention is a stand-alone computer program that includes email/messaging functionality and document management functionality. In other embodiments the reminder system of the instant invention is a "middleware" (or ad-on) computer program that operates in conjunction with already existing computer programs, such as a document management system and/or an email/messaging system. The computer program of some embodiments of the invention is encoded on a machine readable storage medium in a server, and is accessible by one or more client devices to utilize the functionality of the computer program, and is associated with one or more databases that are accessed by the compute program. In an embodiment, the reminder system accesses the databases of the other systems in order to create links and associations between the data stored in those databases, such as, for example, a document or an email address list, and stores the associations as a reminder in a separate database. A computer program associated with the reminder system database includes a time schedule feature, such that the database is triggered at the time an action is to be taken and the database automatically generates the reminder via the messaging system along with the associated data from the other databases. In a preferred embodiment, the instant invention is a middleware program adapted for use with any email or messaging and document management system. Popular document management systems, for example, are distributed by Hummingbird™, Interwoven™, SharePoint™, Documentum™, FileNet™, IBM™, Worldox™, and Open Text™. While the examples provided herewith are directed to one aspect of the present invention, namely that aspect being adapted to function with the above listed document management systems, it is contemplated that any document management system may be used in conjunction with the instant invention, all document management systems having equivalent data structures and functionality, or alternatively, the reminder system of the inventive concept may be utilized without any document management system.

In one embodiment, the reminder information corresponding to a particular document is provided by a user at the time of document creation. That is, when the user creates a document, the user simply utilizes the document reminder system, such as, for example, by selecting an appropriate action from an onscreen drop-down menu, or clicking on an appropriate button or other control, to open a window into which the user may enter the appropriate tickler information, such as the reminder date. A reminder and a tickler are used as interchangeable terms in the industry and throughout this disclosure. Because the reminder of the present invention is opened within the on-screen document or in the document management profile or similar screen, other information for the reminder is captured automatically from the database record in the document management system associated with the document. Automatically collected information includes (without limitation): the pointer to the document itself, the date of creation, the author, the client and matter identifiers, the document type, the author's group, and the document management system's document description. All necessary information, such as, for example, the client name and matter number are included and if that information has not been entered yet, for the case where it is a new document that has not been saved to the document management system yet, the present invention will prompt the user to provide the necessary information or, in the alternative, to save the document in the document management system before creating a reminder for the subject document.

In another embodiment, while the user is reading the document in an application, such as, for example, Microsoft Word™, Excel™ or Acrobat Adobe™, an icon in the user's toolbar is clicked, rather than utilizing a drop down menu, to bring up the tickler to be attached to the document. In another embodiment, the user selects a document that has already been created from the document management system, opens that document, and then creates a reminder for that document. In another embodiment, the present system is adapted to scan the document, upon accessing the present system, in order to search for important date information that may be included in the reminder. When appropriate events are identified within the document, the data window is again entered where both user-input and automatically captured data will be stored.

Once the window for creating a reminder is opened, the user may enter the recipient of the reminder, information pertaining to the document and select certain features of the document reminder system. To select a recipient of the reminder, the system of a preferred embodiment allows users to utilize the address list of their current messaging system, thus choosing from existing staff members, a list of outside contacts, vendors, clients, customers, and so on. This prevents the need for creating and maintaining a separate user list for the document reminder system. In the window, the user may provide notation in the form of instructions to be provided at the time a reminder is sent. In this way, the user's recollection will later be easily refreshed and the user will know what action to take with respect to a particular document without spending an inordinate amount of time reviewing the document itself, a corresponding file, or other materials. Likewise, the user may indicate the date on which a later reminder is to be sent, and may request that a copy of the document itself be sent along with the reminder, or that a reference linked to the user's document management system be provided. In addition to entering reminder text, in one embodiment the user may pinpoint the precise section to which the reminder relates such that, when the document is accessed from the reminder message, the document will be opened to the precise clause in the document that is of importance to the date. Additionally, the reminder message may contain a link to a form that is to be used. Companies often have form letters or documents that are used by the entire company. Throughout the years those documents change but are usually saved as later versions of the original document. In a preferred embodiment, the reminder sent includes a link to the document such that when the document is accessed through the reminder the user will be taken to the most current version of the document.

In addition to the above, in the window for creating reminders, the user may opt to provide additional attachments relevant to the document with respect to which the reminder is being generated. This ensures that, for example, additional forms needed to complete the action that must be taken with respect to a document are readily available and that a user does not have to search the document management system for the correct forms and the proper versions that the company wants used at the time the reminder is sent. Further, the user may also provide a checklist to be included with the reminder. In some embodiments, the checklist may be the only document included with the reminder. In some such embodiments, the checklist may be generated by or through the reminder system of the inventive concept. In one embodiment, the action to be taken on a document (and/or from the checklist) has multiple steps, each requiring discrete actions, the checklist helping to ensure that the user completes each and every action required and does not inadvertently neglect one or more actions. The checklist also allows a manager to monitor the progress of a particular project, being able to identify those tasks that have been completed and those tasks that remain. The checklist also permits knowledge transfer in that the checklist, created by experienced users, furnishes a roadmap for novice or less experienced users.

Once a reminder is in place for a particular document, action or group of actions (e.g. checklist), the users need no longer concern themselves with tracking that document and/or reminder, and need only take action when the reminder system informs the user that action is needed, while the reminder system continues to monitor the document/reminder response needs of the user, for all documents/reminders, over time.

In one preferred embodiment, the reminder system monitors and/or tracks the documents/reminders in the following way, the reminder system may, for example, be scheduled to check, one or more times per day, a reminder database created by the reminder system. When a reminder is identified as needing attention, the reminder system retrieves the appropriate reminder message and also retrieves any appropriate document or reference, and additional documents, if any, identified by the user as pertinent to the task at hand. The user is reminded by email, instant message, telephone, pager, facsimile or other means, as chosen by the recipient. Where the reminder is electronic, the message will both contain the reminder information and a link to the pertinent document or documents. The system in question also retrieves procedural checklists, if any, provided by the user, as well as additional notation or instructions on the handling of the document or the event or events (e.g. actions/tasks) that are the subject of the reminder. The reminder system then sends the reminder message, including all of its various components, and any appropriate document to the user's email server (or messaging system) for delivery to one or more users designated to receive the reminder. The user is then able to act on the document/reminder. It is preferred that once the necessary action has been taken with respect to a document/reminder, the user can then indicate to the reminder system that the action (or appropriate step in a multiple-step project) has been completed. In one embodiment, once the user has completed the action or step, the user simply sends a reply message (using the user's email or other messaging system) with the word "complete." In another embodiment, the user utilizes a link in a reminder message to access a web-based portal to the reminder system and post/input information that the reminder is complete. The reminder system then shows the task as completed without the user having to do anything more. In one embodiment, when the user completes the action or step, on a multiple-step project, the user indicates that he/she has completed the item but it is then sent to a supervisor for approval rather than just showing as complete by the system. The supervisor may review the work and set follow-up reminders for non-complete items. It will be appreciated that the reminder system can monitor the documents/reminders in a variety of different ways now known or that will become known in the future in the art.

In another embodiment, the user sets a reminder without the reminder being attached to a document. The reminder may have all of the same features and functions described above, including attaching given pre-set forms (or a link to those forms), setting multiple reminders, setting a reoccurring reminder, attaching checklists and other pertinent information to the reminder.

In another embodiment, the document reminder system automatically creates the reminder based on information inputted by the user in the document management system profile or based on information from the document itself. The document reminder system extracts information from the profile to automatically create the reminder, for example, if a contract expiration date is entered in the profile by the user then an automatic reminder is set for sixty days prior to that expiration date. Alternatively, the document reminder system may scan the document itself and extract important date information and automatically create the reminder based on that information. As in the previously described manually created reminders, the reminder captures the profiled information of the document, such as, for example, the client matter name. If desired the user can later edit the reminder and add any of the functionally described herein, such as a link to forms or other documents, multiple notification dates, task checklists, etc.

In addition to providing the reminder, the reminder system provides reports and calendaring to further aid in the efficient handling of documents and/or events that need attention over time. In one embodiment, the calendaring component of the reminder invention is adapted to provide a user with information related only to documents/reminders for which an action is scheduled on a given day, week, month, or other time period defined by the user. When the user accesses the calendar, the only items shown on the calendar are documents/reminders being tracked or monitored by the reminder system or action items that have been set-up in the reminder system, along with their status, if desired, and other information the user may select. In this way, the user is able to access a calendar that does not contain personal information or information not related to the documents/actions for which reminders have been set, thus providing greater ease of use of the reminder system than would be available by including the information in a user's preexisting calendaring software. Again, the user can access the pertinent document directly from the calendar view of the reminder system, and a supervisor, administrator, or other user with appropriate access privileges can review, in calendar form, the documents that need to be, or have been, acted upon by one or more users. The user can view those documents/information for which action is pending, or can view documents/information for which actions have been completed. In one embodiment, the calendar view provides the user with information concerning who is responsible for the document/reminder, the action needed, and the date upon which the action must be taken. The calendar view also preferably allows the user to go directly to a document (and/or to a particular clause within a document) rather than having to search for the document in the user's document management system or having to scroll through the document once retrieved. In one embodiment, the calendar is searchable by various and customizable fields, for example, by client name, client matter number, document number or document type, in order to give a report to the client for all upcoming actions.

The reporting feature of the reminder system allows, for example, a user in a supervisory position to review all of the documents/reminders needing attention from one or more subordinates. In one embodiment, the reporting feature also allows the supervisor to view the status of the actions needed with respect to the documents/reminders/checklists, thereby determining whether the actions have been completed or are pending. In this manner, a supervisor is able to monitor all steps in a multiple-step project and has the ability to set up follow-up reminders or have the user that completed the item redo the item if it is not satisfactory to the supervisor. The reporting feature of the reminder system provides information to the supervisor concerning which subordinate is responsible for a document/reminder, the date on which an action must be taken, the nature of the action to be taken, and additional comments, notation or the subordinates vacation schedules. Further, the reporting feature preferably allows the supervisor easily to review the appropriate document by selecting it from within the report itself, rather than having to go to the document management system to search for it, thus reducing the chance that the supervisor will access the wrong document or wrong version and reducing exposure to liability.

The administrating feature of the reminder system allows, for example, a user in a supervisory role to change the individual responsible for a calendared event, in order to even out workloads, move all responsibilities in the case where an individual leaves a company, or the individual is on vacation. In one embodiment, the administrating feature allows for a user with the correct authorization to configure user rights, edit user authorization, reassign the owner of a reminders for a specific period of time or permanently, create user groups, create and view vacation schedules, create custom tags, configure the system for customization, and viewing a log for a particular user so that the viewing of documents and reminders is monitored.

The above provides an exemplary description of the reminder system. This description is further supplemented by the documents appended hereto. It is contemplated that a user of the reminder system may customize the system once in place, allowing the system to provide data fields, selections, or other information pertinent to the user's business. The present disclosure should be viewed broadly, and the primary objective of the invention should be seen, broadly, as providing an integrated reminder system that interfaces with a user's existing document management, calendar and/or email systems.

It should be understood that the various descriptions and illustrations of the present system set forth herein are exemplary and are not intended to limit the scope of the present invention. Upon reading this disclosure, many variations and modifications will be apparent to those of skill in the art, and it is contemplated that these variations and modifications are within the spirit and scope of the present invention.

BRIEF DESCRIPTION OF THE DRAWINGS

Preferred embodiments of the invention, illustrative of the best mode in which the applicant has contemplated applying the principles, is set forth in the following description and is shown in the drawings and is particularly and distinctly pointed out and set forth in the appended claims.

FIG. 4a is a sample screen shot of an embodiment of a document reminder system showing the reminder sent by the document reminder system including an attached document.

FIGS. 17 through 25 show various sample screen shots of a checklist management reminder system embodiment of the present invention.

DETAILED DESCRIPTION OF PREFERRED EMBODIMENTS

As required, detailed embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art variously to employ the present invention in virtually any appropriately detailed structure.

Embodiments of the present invention are described in the context of a user interface system that uses an already existing document management system, an email system and/or other various systems in order seamlessly to link the multiple systems together. The reminder system has endless applications including, but not limited to: checklist management, contract management; contract milestones or evergreen clauses; regulatory compliance, such as Sarbanes Oxley; project document monitoring; certification and license renewals; maintenance and warranty agreements; real estate transactions, lease agreements, insurance contracts, human resources documents, such as employee reviews and benefits reminders; ongoing client correspondence; training manual updates; trademark and patent docketing; and other basic docketing.

FIGS. 1 through 16 described below discuss embodiments of the invention specific to reminders relating to documents. Such embodiments are referred to herein as document reminder systems, and also generally as reminder systems. FIGS. 17 through 25 described below discuss an embodiment of the invention specific to reminders contained in a checklist that includes multiple action items. Such embodiment is referred to herein specifically as a checklist management system, and also generally as a reminder system. Although not specifically detailed in the below description, it will be appreciated that in some embodiments features discussed in connection with the document reminder systems of FIGS. 1 through 16 will be included in the checklist management system, and vice versa.

Figure 1:
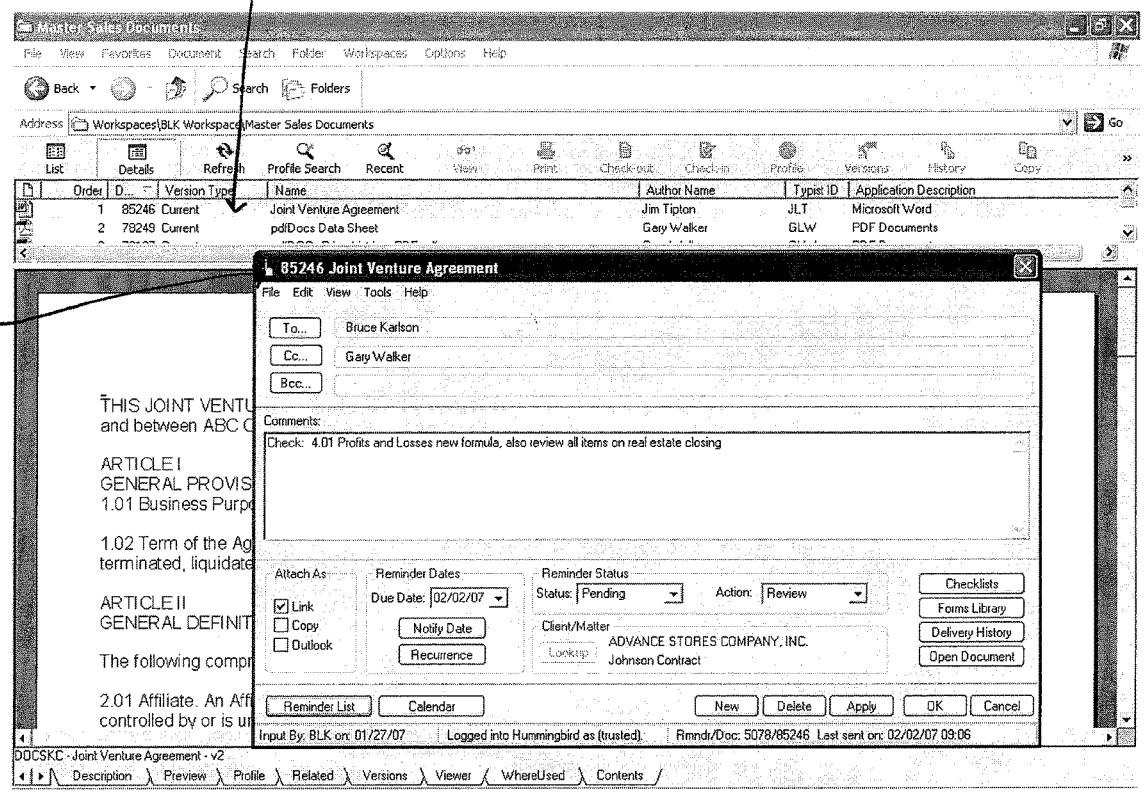
FIG. 1 is a sample screen shot of an exemplary embodiment document reminder system of the inventive concept in connection with setting up a reminder within the present invention.
Figure 1A:
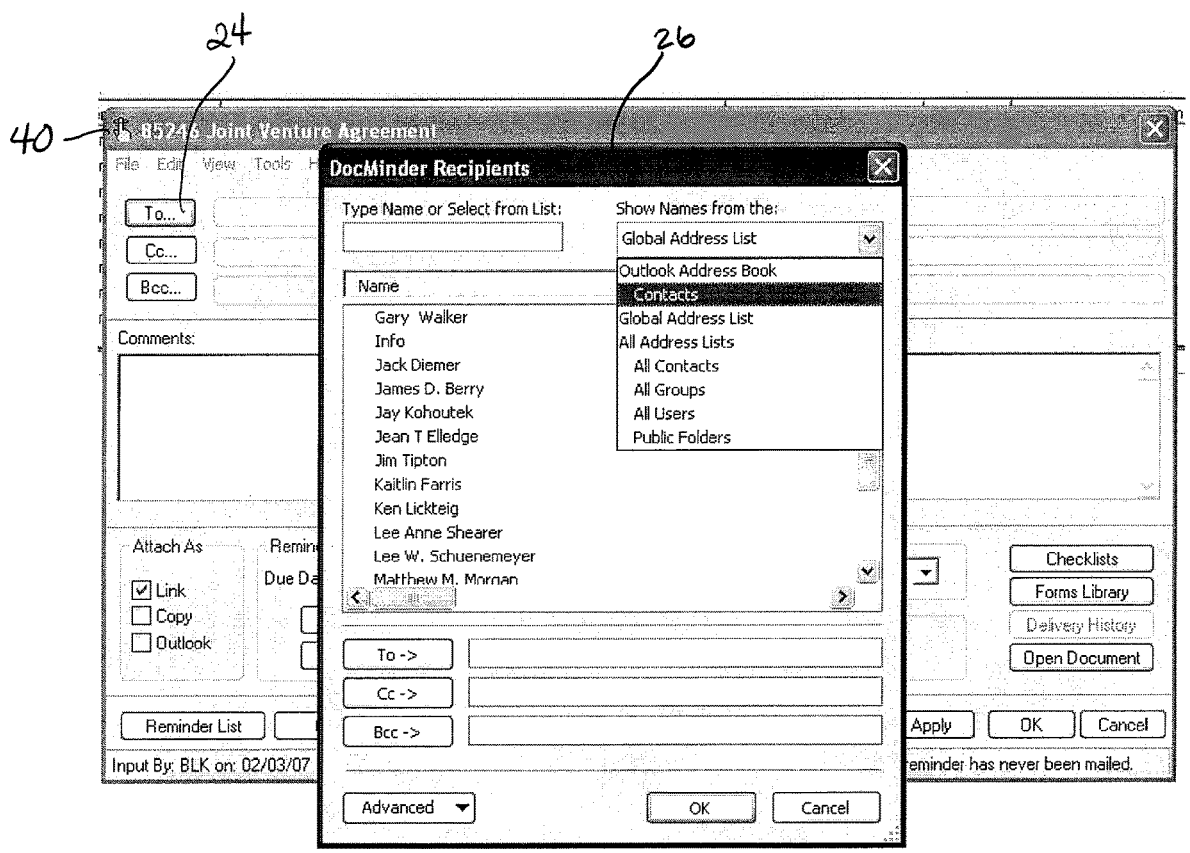
FIG. 1a is a sample screen shot of the system of FIG. 1 showing an address list utilizing the user's current email messaging system.

In one embodiment, referring to FIG. 1, a document reminder system 20 is utilized to set-up a reminder by selecting a document 22 from a document management system by right clicking the user's mouse on document 22 and having a reminder window 40 open on the user's screen. That reminder is now automatically linked to document 22 and that reminder is stored in a database of the document reminder system. At this time the user selects the appropriate person(s) to be responsible for document 22 from the user's existing email contacts. Referring to FIG. 1*a*, the user selects a To button 24 in reminder window 40 and a Recipients window 26 opens. Recipients window 26 utilizes the contact information from the user's email messaging system, thus allowing users to select themselves, a different user at the company, an entire group, or even an individual outside of the company, such as a client, vendor, customer, opposing counsel, local counsel or other individuals. This feature prevents the need for creating and maintaining a separate contact list for the document reminder system. In one embodiment, the user may carbon copy or blind copy recipients.

It will be appreciated that there are other known ways to select the document so that a window to enter information will open, including but not limited to, selecting an appropriate command from an onscreen drop-down menu, or clicking on an appropriate button or other control, either from within the document management system or from within the profiled document such as a Microsoft Word document. Any function may be utilized that will allow for the reminder window to open into which the user can then enter the appropriate information. Because the reminder window is opened within the on-screen document (or document management system), other information for the reminder is captured automatically from the database record (called a profile) in the document management system associated with the document. Information automatically collected may include: the pointer to the document itself, the date of creation, the author, the client name, the client matter number and identifiers, the document type, the author's group, and the document management system's document description, to name some of the most likely data elements.

The user has the option to attach document 22 to the reminder as a direct link to document 22 in the document management system or as a copy of document 22. In one embodiment, the user has the ability to open the document, for example, if the user wants to copy and paste a paragraph that needs attention, such as a termination clause, in the notation of reminder window 40.

In one embodiment, the present system is adapted to scan the document, upon accessing the present system, in order to search for important date information that may be included automatically in the reminder. In another embodiment, the user may pinpoint the precise section to which the reminder relates, such that, when the document is accessed from the reminder, the document will be opened to the precise clause in the document that is of importance and which describes or mandates the action needed. In another embodiment, a user can set-up the reminder while within a document application, such as, for example, Microsoft Word™, Excel™ or Acrobat Adobe™, by simply clicking on an icon located in the user's toolbar or similar location the reminder window will open and automatically attach the document the user has open to the reminder along with any automatically collected information (as discussed above).

Figure 2:
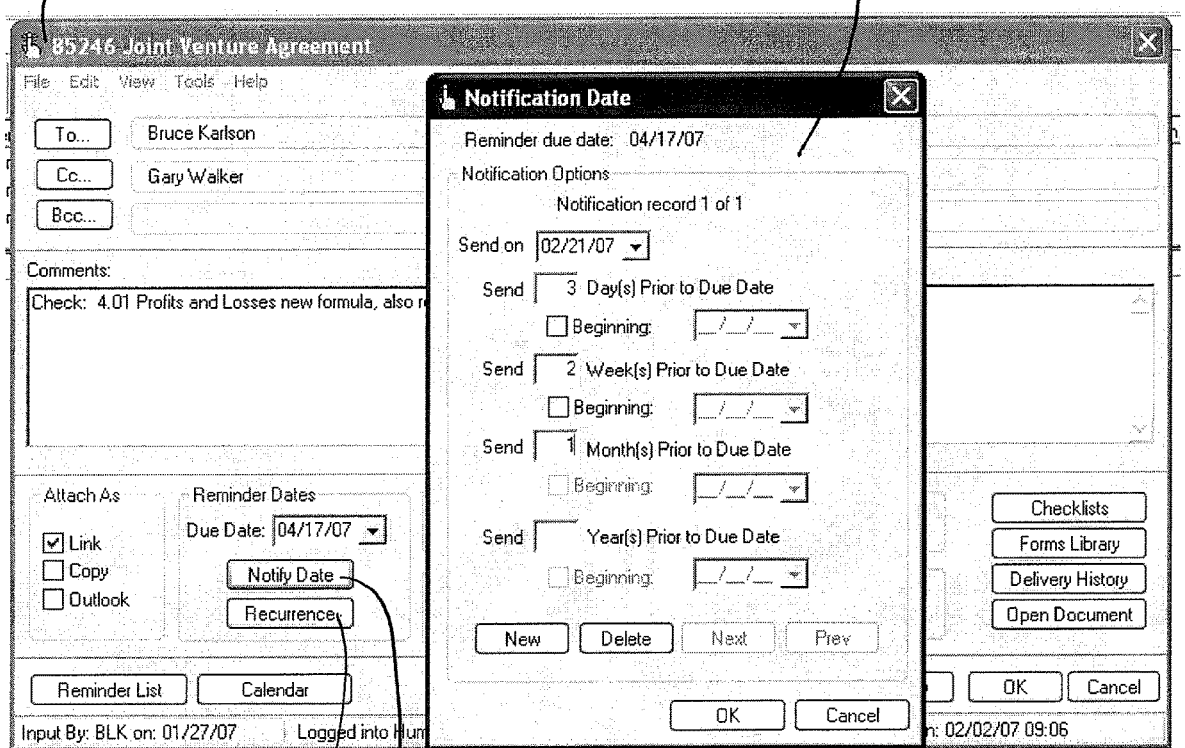
FIG. 2 is several sample screen shots of the system of FIG. 1 showing setting a notification date for the document reminder, with an option for the notification date to be recurring.
Figure 2:
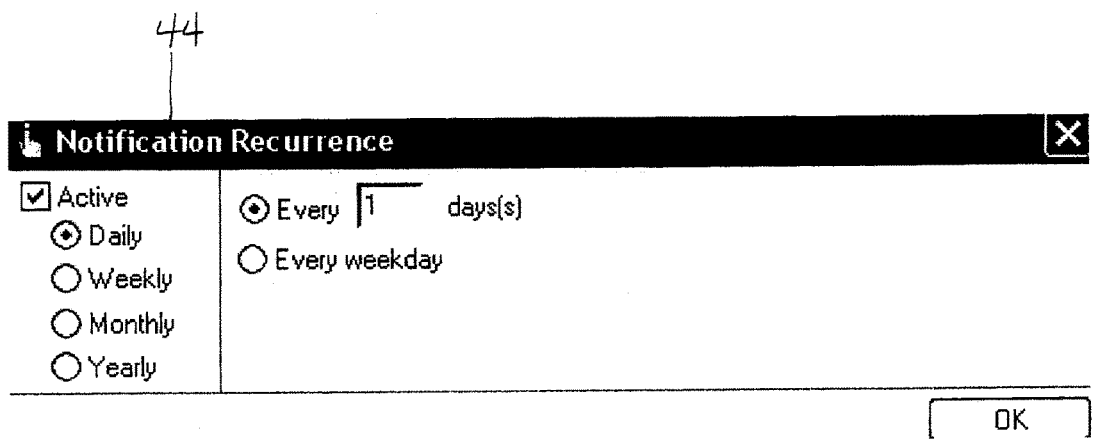

Once the window for creating the reminder is opened, the user enters information pertaining to document 22 and selects certain features of document reminder system 20. For example, the user may provide notation in the form of instructions to be provided at the time the reminder is sent. Referring to FIG. 2, the users selects a Notify Date button 41 and a Notification Date window 42 opens. The user indicates the date on which the reminder is to be sent. This date can correspond to any important date, such as, for example, a contract renewal notice, a patent due date, client follow-up note or other key dates relating to the document. Multiple notification dates may be selected by the user, for example, the user may want the reminder to be sent 1 month, 2 weeks, 1 week, 3 days, and on the due date of the important date. If multiple notifications are set and the user completes the action item and sends a completion email by replying to the reminder, then future reminders will not be sent.

In one embodiment, the user can set notifications to be sent after the due date, until the item is completed, for example, every day after the action item is due until the user completes the item. In one embodiment, the user may create the reminder for a date in the future beyond the due date of the action item, for example, if the user wants a reminder to send the completed document to the client for review. The user is therefore not limited to picking one notification date, but rather may select as many dates as are necessary and therefore setting up as many reminders to that particular document as the user wants. The user may also create a recurring date by selecting a Recurrence button 43 so a Notification Recurrence window 44 opens. The user can set a reoccurring reminder to coincide with an important document date, such as, for example, if a 15-year vendor contract has a clause that the vendor must carry insurance, the reoccurring reminder can be sent to the user to remind the user to check and make sure that the vendor has a current insurance policy.

In one embodiment, the personal electronic calendar of the user, for example, Microsoft Outlook™, Lotus Notes™ or Novell GroupWise™, synchronizes with the calendaring feature of the document reminder system such that the user's personal calendar is updated automatically when any reminder is set-up for that user, no matter what user has set the reminder, and such that if the user makes a change to the reminder in the user's personal calendar then the calendar of the document reminder system is automatically updated. In one embodiment, a contract's expiration date may be set-up as the reminder to the user. The user can then confirm that the contract has indeed expired and view a document retention table within the document reminder system and then set a new reminder that coincides with the proper retention dates. When the future reminder is then sent the user can determine if the document should continue to be retained or if it should be destroyed. The time necessary to retain documents depends on the law at the time the contract expires, therefore, current data retention tables may be accessed when the document expires in order to set the correct retention schedule for that document.

Figure 3:
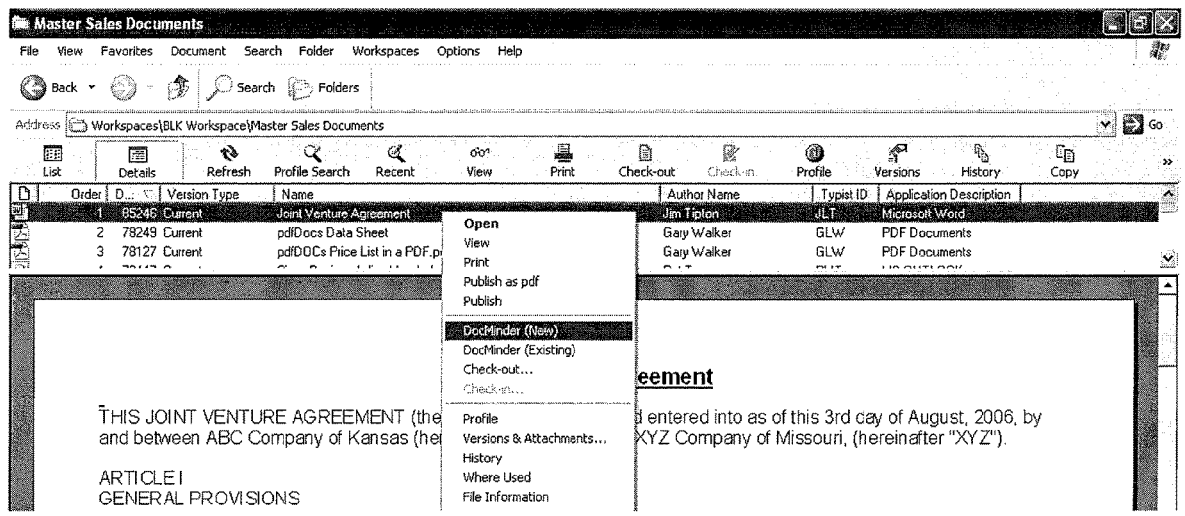
FIG. 3 is several sample screen shots of an embodiment of a document reminder system showing a review of the action items for a document by selecting that document from a document management system and then showing the reminder that has been previously set up for that document.
Figure 3:
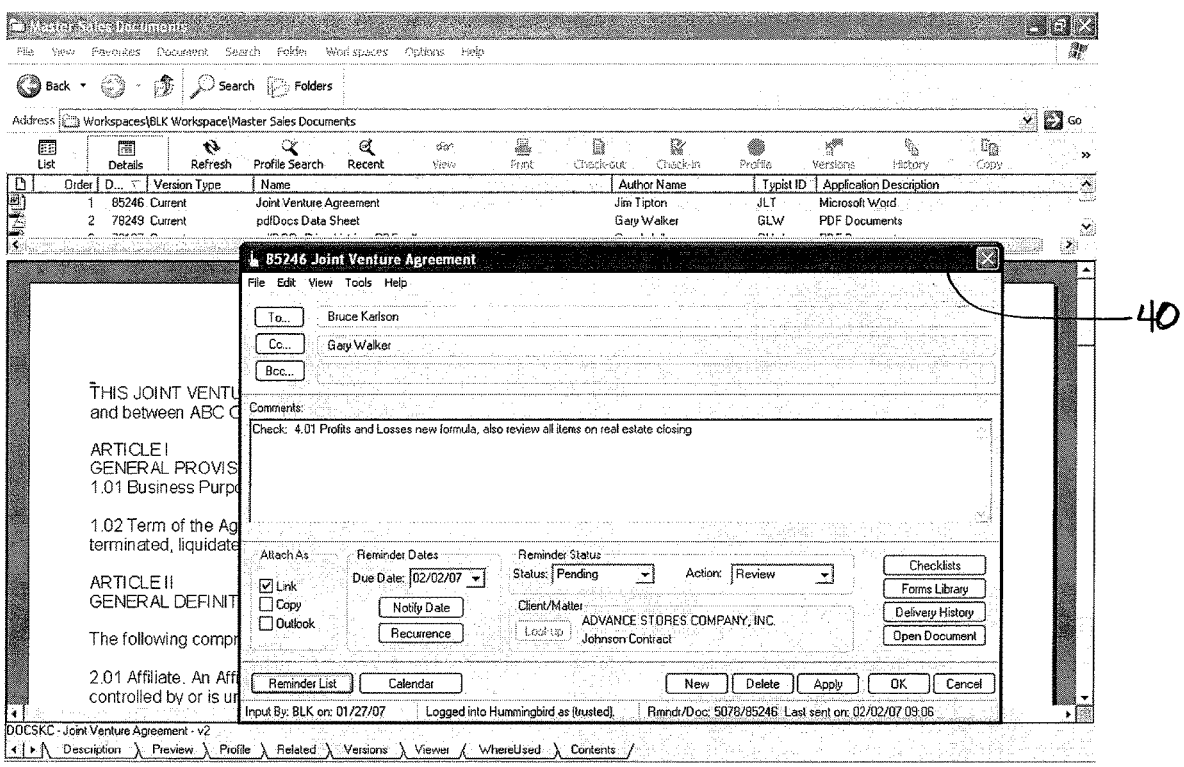
Figure 4:
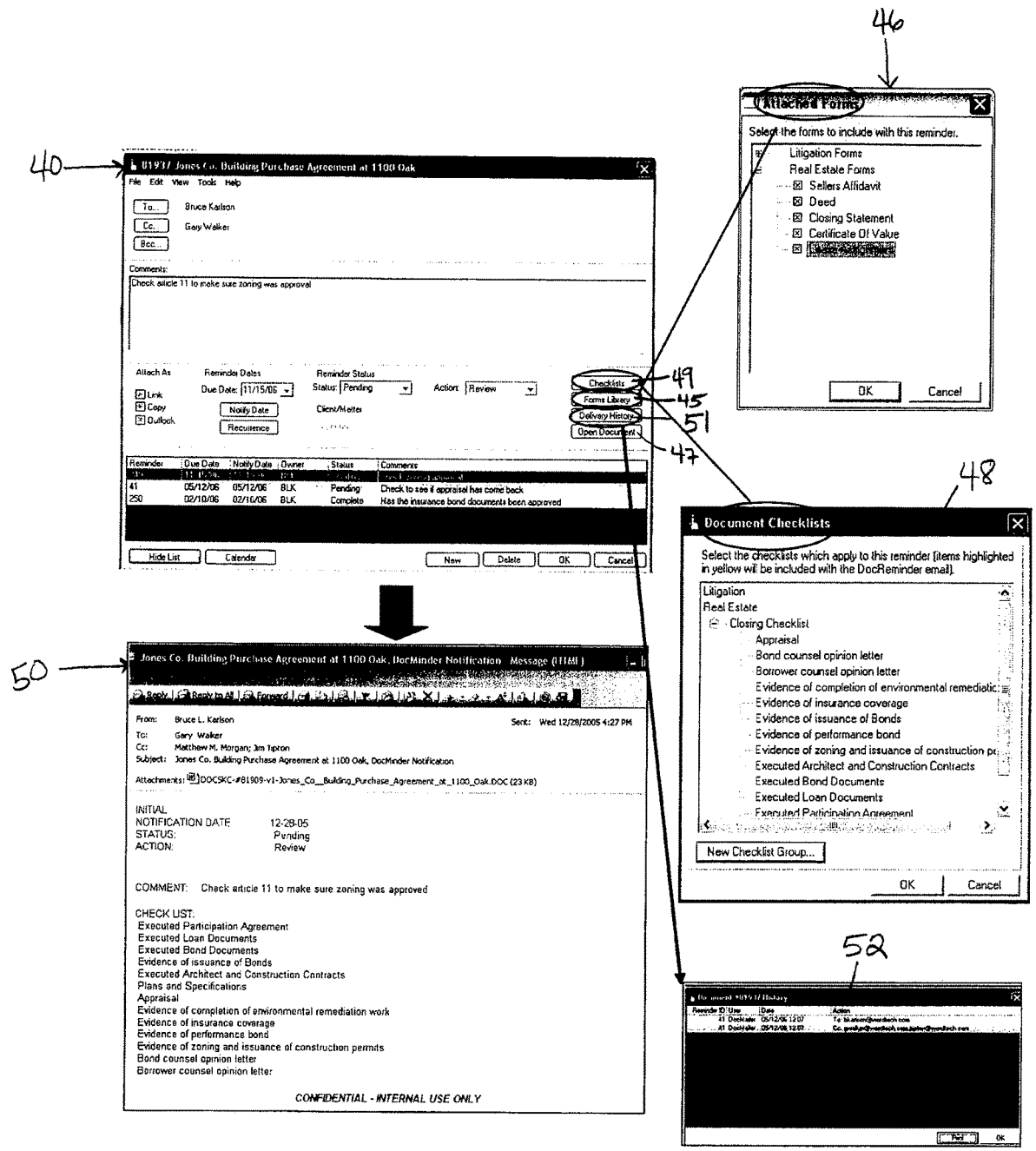
FIG. 4 shows several sample screen shots of the reminder of an embodiment of a document reminder system showing various pop-up features, such as an attached forms window, a task checklist window, and a delivery history of the reminder, also showing an example of how the reminder will look as an email when opened by a user.

In addition to the above, the user may opt to provide additional attachments relevant to the document with respect to which the reminder is being generated. Referring to FIGS. 3 and 4, reminder window 40 has various options available to the user so that the user may attach additional information to the reminder.

The user may attach additional pre-set forms or templates to the reminder by selecting a Forms Library button 45 that opens an Attached Forms window 46. This ensures that additional forms needed to complete the action that must be taken with respect to the document are readily available and that a user does not have to search the document management system for such forms and their correct version. Once Attached Forms window 46 is open, the user can select which form(s) that he/she wants to attach to the reminder, such as, for example, a form to be used as an example of how the document should be drafted or another correlating agreement that is pertinent to the document or form. Most companies have set form letters that are to be sent to clients, vendors or other such correspondents and by having a form linked to the reminder, whenever that reminder is opened the most current version of the form will be accessed.

The user may provide a checklist to be included with the reminder by selecting a Checklists button 49 which opens a Document Checklists window 48. In an instance wherein the action to be taken on a document has multiple steps, each requiring discrete actions, the checklist helps ensure that the user completes each and every action required and does not inadvertently neglect one or more actions. In one embodiment, the various tasks in the checklist may be handled by different users and each item on the checklist item can be assigned to a different user so that all users working on the project know who is responsible for what documents or action items and when they are due. This feature allows for the quick delegation of assignments within a project to a group of users and allows for quicker and more informed work flow. In one embodiment, completed items can be approved by the supervisor and follow up reminders can be assigned for uncompleted items or items not done to the satisfaction of the supervisor.

In another embodiment, the user may create the reminder at a later time than when the user first created or reviewed the document. The process is similar to that described above, the user selects a document in the user's document management system and then accessing the document reminder system, such as by right clicking on the particular document in the document management system to select and launch the document reminder system. Similarly, a user may edit a reminder at anytime and the entire document reminder system and corresponding reminders on personal calendars are automatically updated.

In another embodiment, the document reminder system automatically creates the reminder based on information inputted by the user in the document management system profile or based on information from the document itself. The document reminder system extracts information from the profile to automatically create the reminder, for example, if a contract expiration date is entered in the profile by the user then an automatic reminder is set for sixty days prior to that expiration date. Alternatively, the document reminder system may scan the document itself and extract important date information and automatically create the reminder based on that information. As in the previous manually created reminders, the reminder will capture the profiled information of the document, such as, for example, the client matter name. If desired the user can later edit the reminder and add any of the functionally described herein, such as a link to forms or other documents, multiple notification dates, task checklists, etc.

Figure 8:
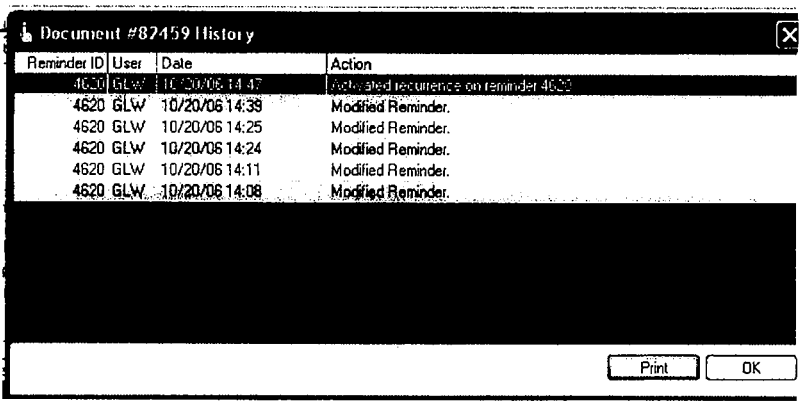
FIG. 8 is a sample screen shot of the reporting feature of an embodiment of the present system showing, in list form, a history of activity on a specific reminder.

In another embodiment, referring to FIGS. 4 and 8, after the reminder is created, the user may select a Delivery History button 51 and a history report 52 that summarizes the email delivery history of all the reminders for that document. This feature allows for a detailed and uneditable audit trail of all users and outside individuals that have received the reminder regarding the document. In yet another embodiment, the user has the ability to access a history report that displays when a reminder had been viewed by the receiver of the reminder.

Once a reminder is in place for a particular document, users need no longer concern themselves with tracking that document, and need only take action when the document reminder system informs the user, for example, by a reminder message 50 that is generated by the document reminder system of the instant invention, that action is needed, while the document reminder system continues to monitor the document response needs, for all documents, over time. Referring to FIG. 4a, illustrating an example of reminder message 50 with an attached document. This is what the user receives when an action item is needed. Reminder message 50 includes information related to the various functionality and options described herein. In the reminder message examples, illustrated by FIGS. 4 and 4a, reminder message 50 is in the form of an email; however, it is contemplated that the reminder message could be an instant message, a text message, a pager message, a facsimile or other type of communication, as chosen by the recipient.

The way in which the document reminder system monitors and/or tracks documents is now described briefly. It should be understood that the following is exemplary of the mode of operation of the document reminder system, and is not to be construed as limiting. Much of the functionality of the document reminder invention may be provided in other ways that will be obvious to one of ordinary skill in the art upon reading this disclosure.

The document reminder system may, for example, be scheduled to check, one or more times per day, a document reminder database created by the document reminder system. When a document reminder is identified as needing attention, the document reminder system retrieves the appropriate reminder message and also retrieves the appropriate document or reference copy and additional documents, if any, identified by the user as pertinent to the task at hand. The system also retrieves procedural checklists, if any, provided by the user, as well as additional notation or instructions on the handling of the document. Referring to FIG. 4, the document reminder system then sends a reminder message 50, including all of its various components, and the appropriate document to the user's email server for delivery to one or more users designated to receive the reminder. The user is then able to act on the document. In a preferred embodiment, once the necessary action has been taken with respect to a document, the user can then indicate to the document reminder system that the action has been completed. The user simply replies to reminder message 50 and types "complete" as a message and then hits the "send" or similar functioning button. In one embodiment, a completion email is sent by an individual outside of the company, regardless of the messaging system that individual is using (for use when the reminder is sent to a vendor or client). The document reminder system will then update the status of the reminder as completed upon receipt of the email. In one embodiment, the reminder will be sent to a supervisor to approve the action that was completed. At that time, the supervisor may not approve the reminder and send it back to the user if more work is needed. The supervisor may assign follow up reminders for uncompleted items or additional items.

Figure 5:
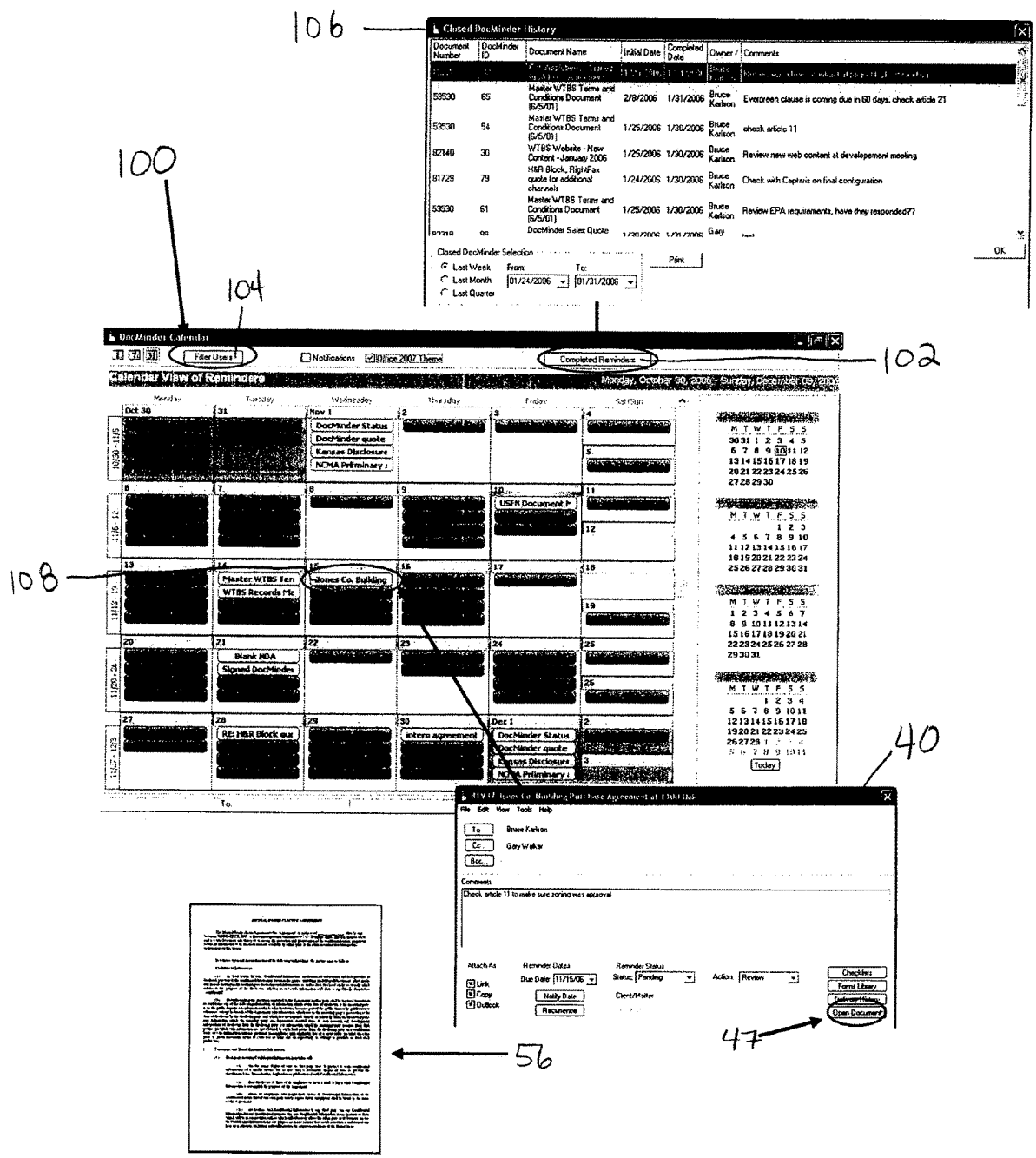
FIG. 5 shows several sample screen shots of an embodiment of a document reminder system showing a calendaring and a reporting feature with the ability to filter the calendar view, for example, by individual, group, or client, open the reminder and view the correct document.

In addition to sending reminder message 50, the document reminder system provides reports and calendaring to further aid in the efficient handling of documents that need attention over time. Referring to FIG. 5, illustrating the calendaring component, a calendar 100, of the document reminder system is adapted to provide a user with information related only to documents for which an action is scheduled on a given day, week, month, or other time period defined by the user. When the user accesses calendar 100, the only items shown on the calendar are documents being tracked or monitored by the document reminder system, along with their status, if desired, and other information the user selects. In this way, the user is able to access a calendar that does not contain personal information or information not related to the documents for which reminders have been set. The user, for example a supervisor, viewing calendar 100 that has, for example, all the items that the supervisor's staff needs to complete in an upcoming month, the supervisor can reassign upcoming work to balance the work load of the staff.

In one embodiment, illustrated in FIG. 5, the different reminders are click buttons (or active links) with the reminder name showing. When a reminder entry 108 is accessed reminder window 40 opens for the user to review. Again, the user can access a document 56 directly from the calendar view of the document reminder system by selecting the Open Document button 47. A supervisor, administrator, or other user with appropriate access privileges can review, in calendar form, the documents that need to be, or have been, acted upon by one or more users.

Calendar 100 provides the user with information concerning who is responsible for the document, the action needed, and the date upon which the action must be taken. The user can view only those documents for which action is pending, or can view documents for which actions have been completed by selecting the Completed Reminders button 102. A completed reports window 106 allows the reviewer to view what reminders were completed and when they were completed. This is also a quick and efficient way for the reviewer to ensure that any reminders that were set up by the reviewer for other users have been completed. In another embodiment, completed reminders can be sorted and printed for use as an audit report.

Calendar 100 also allows the user to go directly to a document rather than having to search for the document in the user's document management system. In one embodiment, the calendar is searchable by various and customizable fields by selecting a Filter Users button 104 that can, for example, allow the user to filter calendar 100 by individual, group, client, document type, etc.

Figure 16:
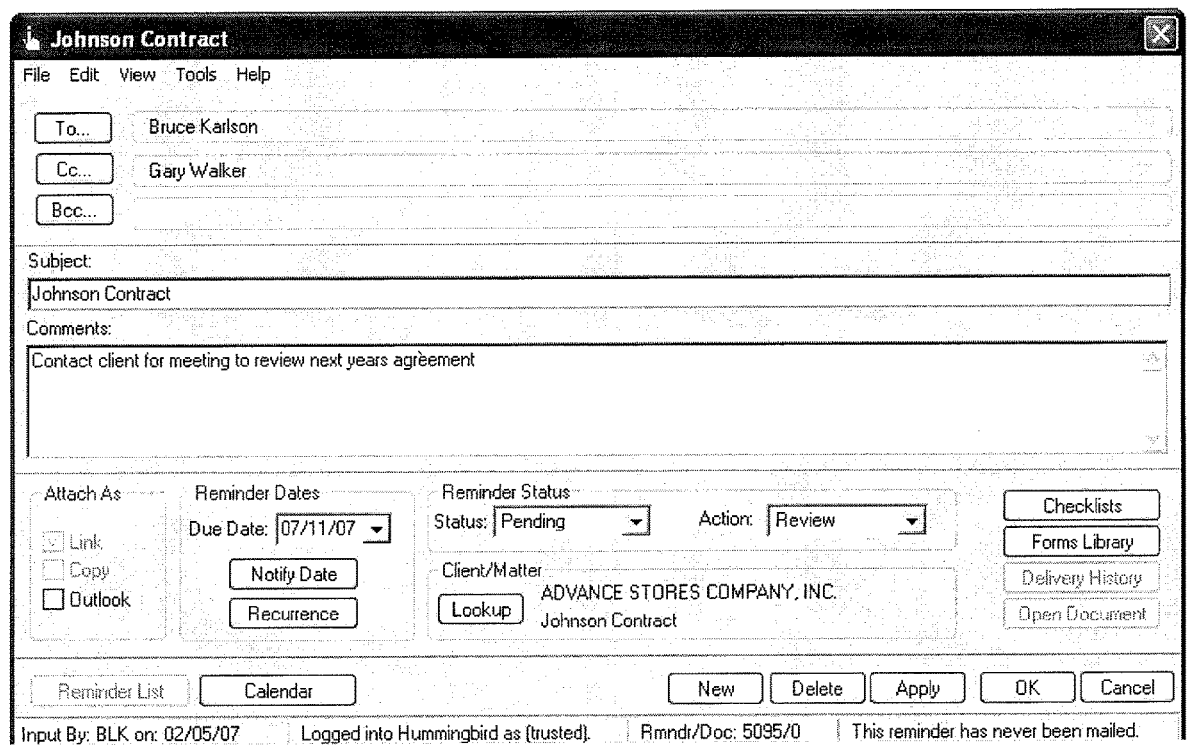
FIG. 16 is a sample screen shot of an embodiment of the present invention showing a reminder being set without being attached to a document but that has all other functionality of the present invention.

In yet another embodiment, referring to FIG. 16, the user may create a reminder that is not related to a document. This reminder will appear as an entry to the calendar. The user need only type a subject in the subject line that the reminder pertains to, thus giving the reminder a title that will appear on the calendar. The reminder has the same abilities to, for example, access the email contacts address list, attach forms, include checklists, reference data tables, set several notification dates, and set reoccurring dates. The user also has the ability to access tables in the document management system or other systems to find the proper filing information, such as, for example, the client name or client matter number.

Figure 6:
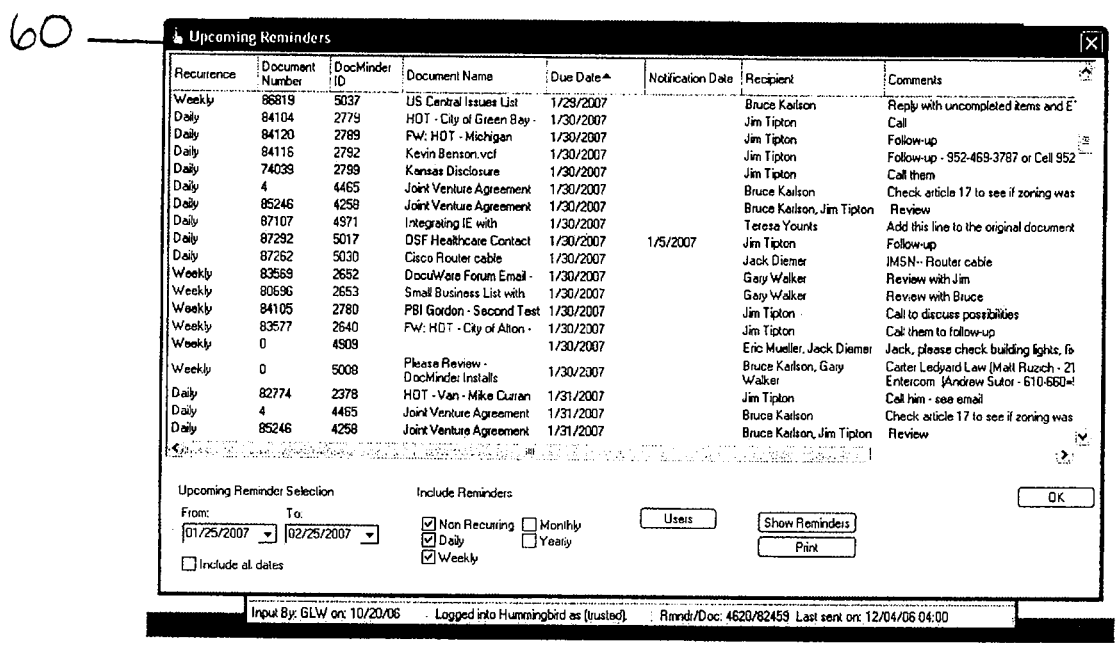
FIG. 6 is a sample screen shot of the reporting feature of an embodiment of the present system showing a list of upcoming reminders and ability to sort and print reports.
Figure 7:
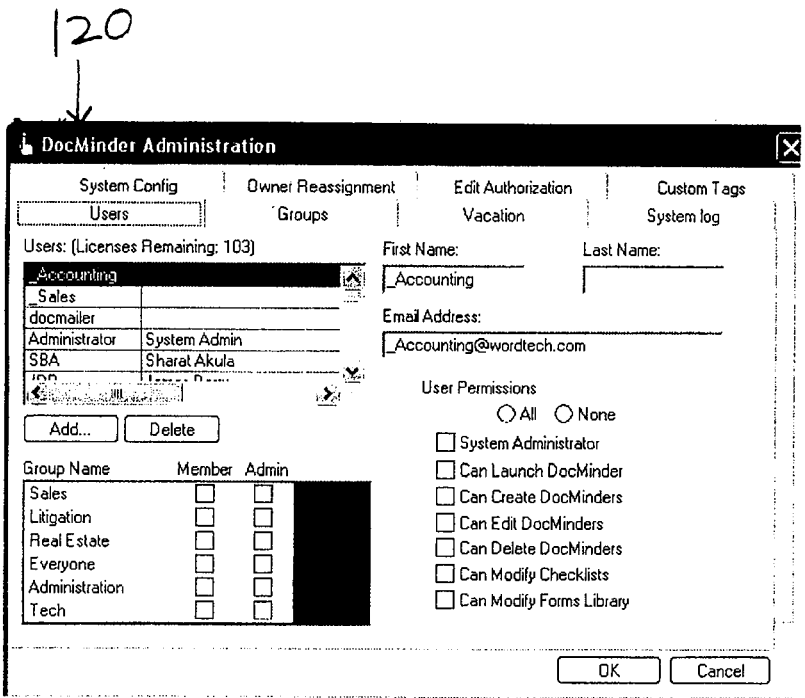
FIG. 7 is a sample screen shot of an administrating feature of an embodiment of the present system showing a user rights configuration and assignment feature.

The reporting feature of the document reminder system allows, for example, a user in a supervisory position to review all of the reminder events and/or documents needing attention from one or more subordinates. Referring to FIG. 6, upcoming reminders can be produced and sorted. The user accesses a Report window 60 and may select different variables in order to create the wanted report, such as, for example, the reporting feature can create a report to give to the client for all upcoming events. In one embodiment, the reporting feature allows the supervisor to view the status of the actions needed with respect to the documents, thereby determining whether the actions have been completed or are pending.

When an item is marked as completed by the user, a supervisor may approve the item and/or assign follow-up items when necessary. The reporting feature of the document reminder system may provide information to the supervisor concerning which subordinate is responsible for a document, the date on which an action must be taken, the nature of the action to be taken, and additional comments or notation. Therefore, the supervisor can easily look into the future through the calendar and reassign upcoming work to balance the work load of their subordinates. In another embodiment, the reporting feature allows the supervisor to easily review the appropriate document by selecting it from within the report itself, rather than having to go to the document management system to search for it.

Figure 9:
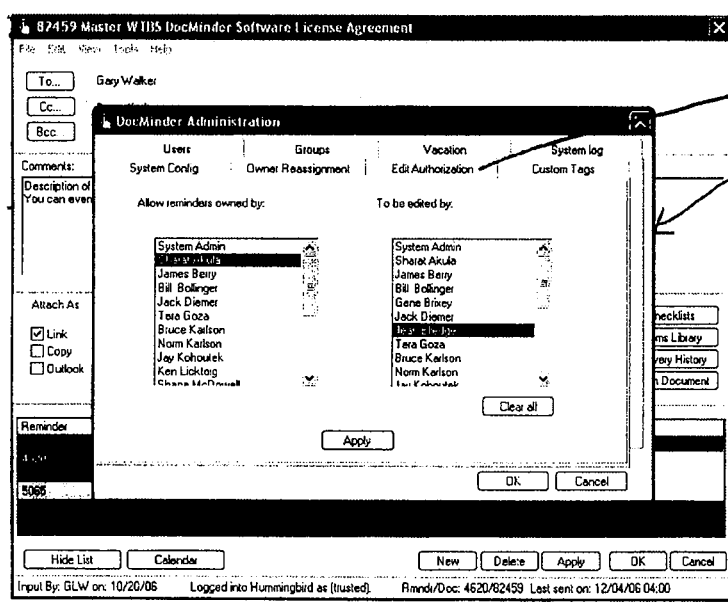
FIG. 9 is a sample screen shot of the administrating feature of FIG. 7 showing an editing feature that allows individuals to delegate/share reminders with other users.
Figure 10:
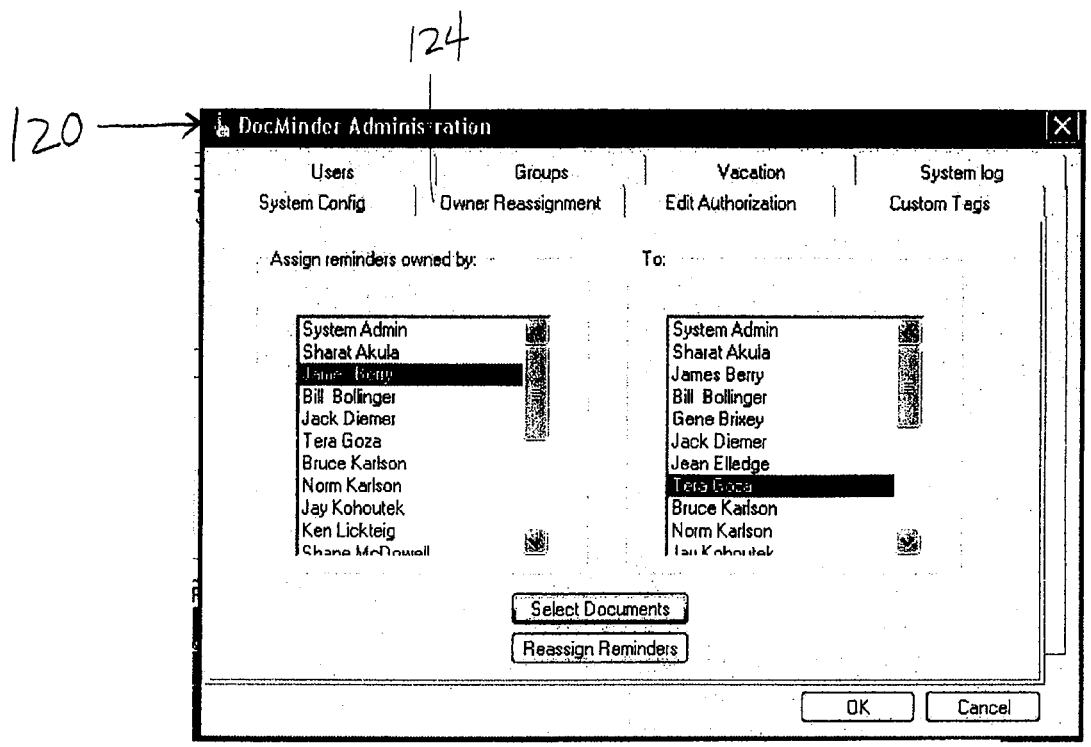
FIG. 10 is a sample screen shot of the administrating feature of FIG. 7 showing the ability to re-assign future reminders and calendar entries to other users (used for example, when someone leaves the company).

Referring to FIGS. 7, 9-15, the administrating feature of the document reminder system allows for a user in an administrative role, such as, for example, an office manager, a project manager, or a billing attorney to make administrative changes to the document reminder system. In one embodiment, referring to FIG. 7, the administrating feature is accessed through the document reminder system and utilized using an administration window 120. By using administrative window 120 the administrator has various options for customizing the document reminder system. Referring to FIG. 9, the user in a supervisory role may change the individual responsible for a calendared event by selecting an Edit Authorization tab 122. Edit Authorization tab 122 allows for the administrator to delegate/share reminders to other users. This feature may be used to even out workloads by moving a few assignments from one user to another or may be used when an individual is on vacation so that the reminders to that person are redirected temporarily. Referring to FIG. 10, the user in an administrative role may reassign all future email reminders and calendar entries to another user when an individual leaves the company or moves to a different department.

Figure 11:
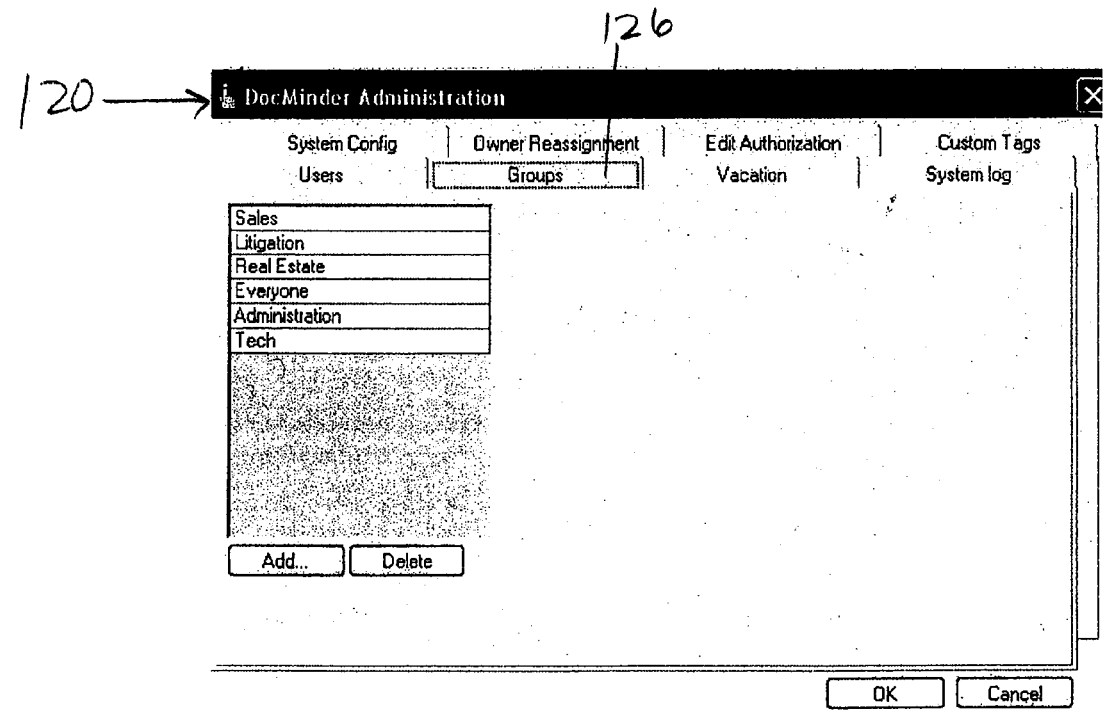
FIG. 11 is a sample screen shot of the administrating feature of FIG. 7 showing the creation of user groups.
Figure 12:
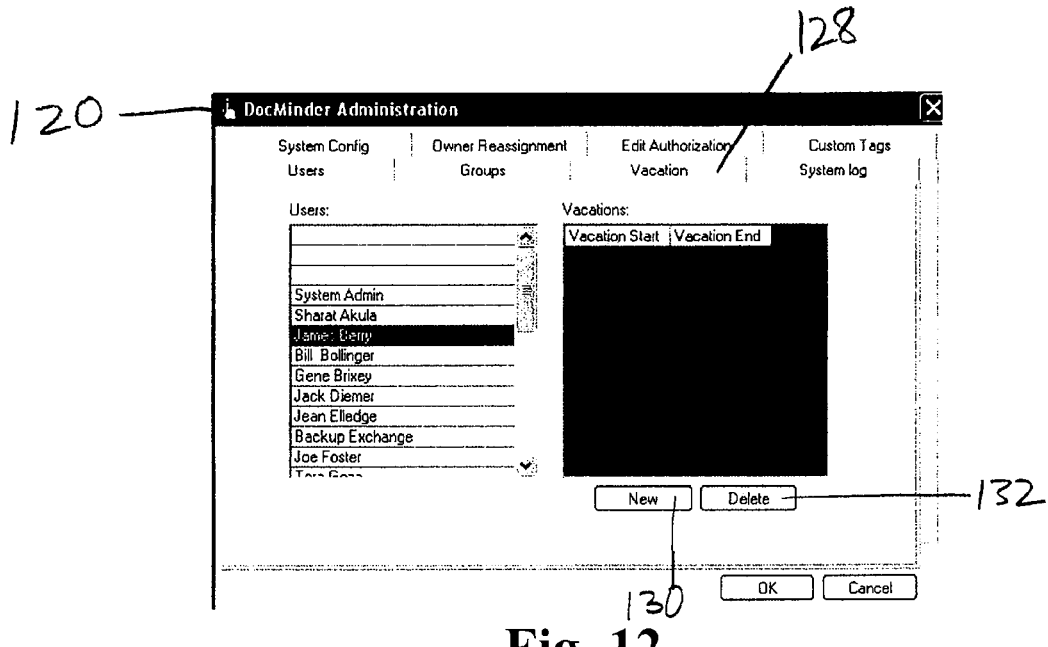
FIG. 12 is a sample screen shot of the administrating feature of FIG. 7 showing a vacation feature that allows for a user to track his/her scheduled vacation.
Figure 13:
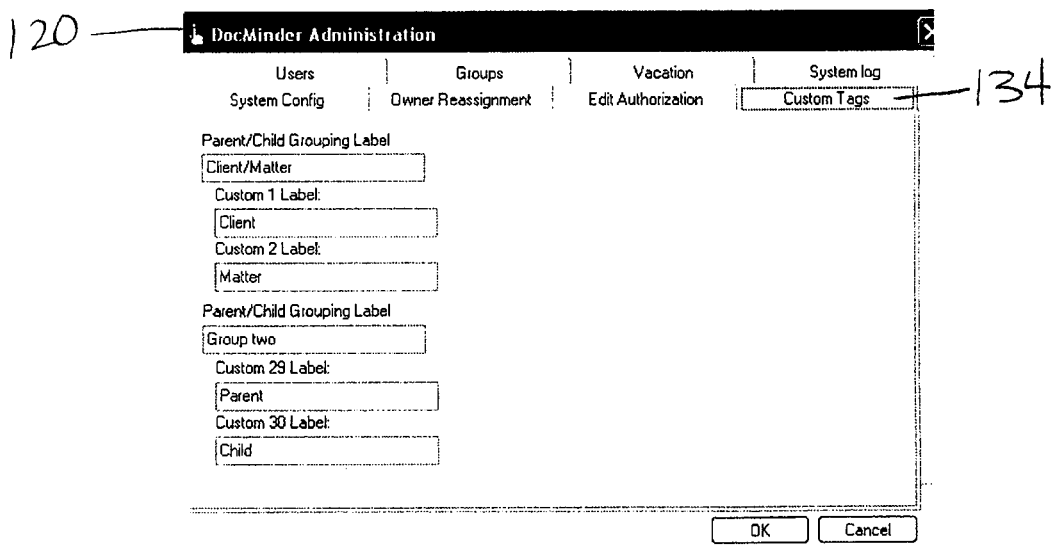
FIG. 13 is a sample screen shot of the administrating feature of FIG. 7 showing a custom tag feature allowing the user to customize the document reminder system of a preferred embodiment, such as by employing an alternative client/matter filing system.

In one embodiment, referring to FIG. 11, administrative window 120 provides the ability to create user groups. This feature allows the administrator to put individuals in to a group, such as, sales, litigation, real estate, everyone, administration or tech. These groups can then be used by any user of the system to set a reminder (as opposed to using an individual own contacts list from the email/messaging system). In one embodiment, referring to FIG. 12, the administrator, by selecting a Vacation tab 128, can enter vacation schedules for any user. The vacation schedules are then coordinated with the calendaring feature. In another embodiment, referring to FIG. 13, the user, by selecting a Custom Tags tab 130, can create custom tags that will allow for sortable fields such as client/matter for the reminders. In yet another embodiment, referring to FIG. 14, the user, by selecting a System Config tab 126, the administrating feature allows the user to configure the document reminder system in conjunction with the server, to enable defaults for attachments and reminder window format. In one embodiment, referring to FIG. 15, the user, by selecting a System log tab 138, can view a system log that shows the reminders that have been created, edited and completed.

Referring to FIGS. 17 through 25, an embodiment of a checklist management system and method of the present invention is shown.

Figure 17:
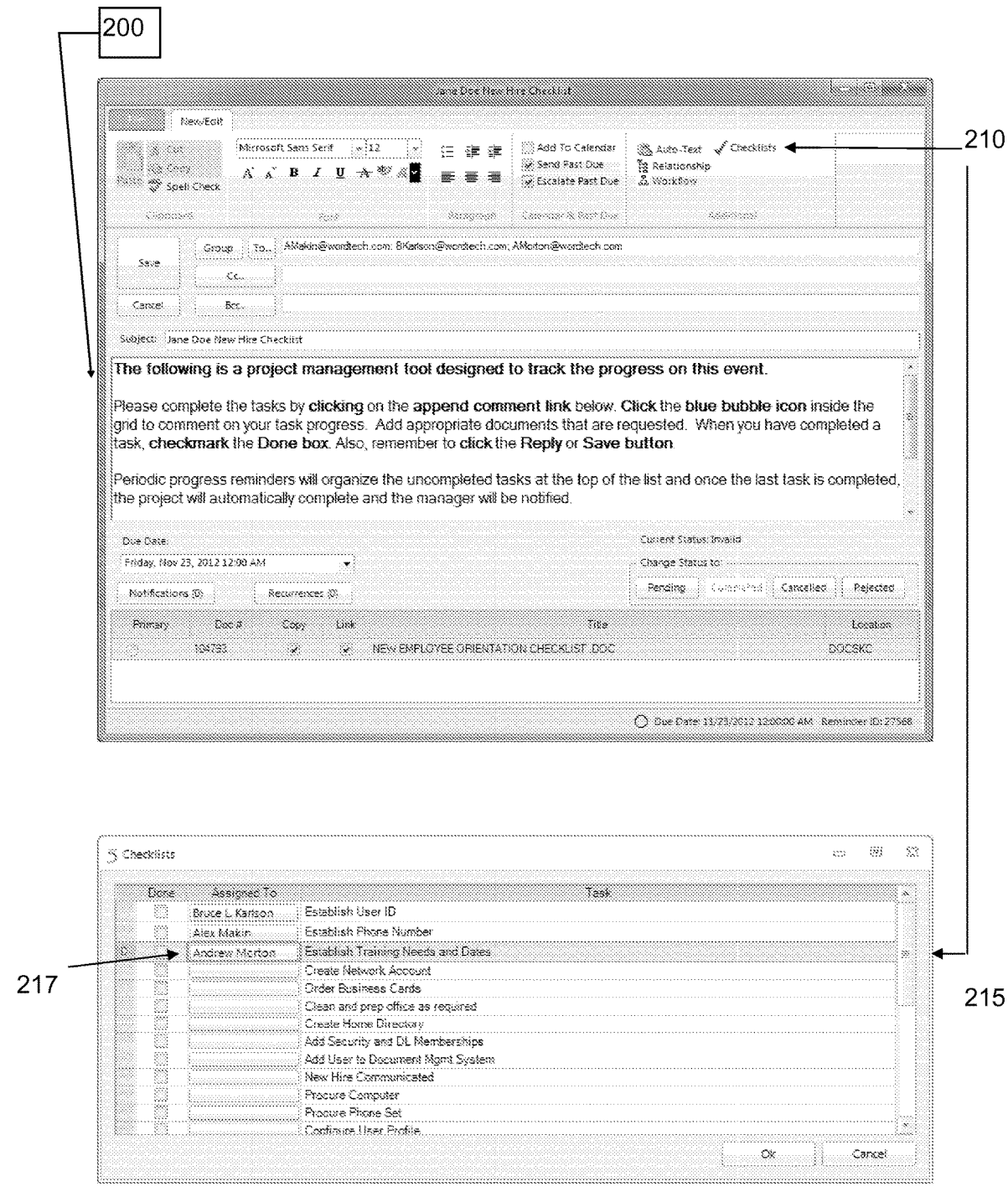

In FIG. 17 a user of the reminder system (such as an "owner" of a reminder, e.g. an assigner of tasks such as a manager or supervisor) opens a new reminder 200 which serves as the project, enter who will receive the reminder notifications, who is responsible for follow through, the subject and descriptive information, due date and any related documents and other information as needed or desired. In the embodiment shown in FIG. 17, reminder 200 is in the form of a new email message. In the embodiment shown, the reminder system functionality is accessed through a plug-in in the user's email system that provides tabs, buttons or other input options to allow the user to access, configure and/or control the reminder system. It will be appreciated that in other embodiments, the reminder system itself will generate the reminder rather than being part of an email message. In one such embodiment, the user accesses a web portal to the reminder system and the reminder system generates an email message similar to that shown in FIG. 17.

The reminder system user selects the checklist button 210 in reminder 200 which initiates checklist pop-up window 215. In the embodiment shown in FIG. 17, the checklist pop-up window 215 is initially a blank document that includes a task field, and assigned to filed and a done (i.e. "status") field, which are all blank. In other embodiments, selection of the checklist button 210 brings up a list of options that allows the user to select either the blank checklist 215 or from a list of saved templates. Saved templates will look similar to checklist 215 with the task field populated with task descriptions. The templates and checklist may be stored in a document management system or other database accessible by the reminder system. In the embodiment shown FIG. 17, the checklist is stored in a document management system and the storage location and document id number are shown in association with the checklist document in reminder 200. Also, in the embodiment shown in FIG. 17 the user has the option of attaching a copy of the document or a link to the checklist document with the reminder, or both.

In each row of the task field of checklist 215 the user types in the name and/or textual description of each task (action item) that is to be completed as part of the checklist reminder. Next to each task, in the assigned to field, the user selects an individual (or multiple individuals) that is assigned to the task and desired by the user to complete the task by the deadline associated with the reminder. The individual may be selected from a drop down list populated by the user's email address book which is accessible through input option 217 in window 215, or alternatively may be manually added by the user by including the individual's relevant information (i.e. name, email address, etc.). If a listed task is already completed, the user can mark the status as being "completed" in the "done" field by checking the box. The data entered in window 215 is saved and stored in a database accessible by the reminder system in association with a reminder ID that is unique to the checklist and/or reminder 200. Also, in the embodiment shown, selection of an individual in window 215 will automatically populate the individual's email address into the "to" field of the email message of reminder 200.

In reminder 200, the user can choose options to send reminders for past due actions and also to escalate past due actions by sending reminders on an increased frequency or at a higher priority level. The user may also choose an option to add a reminder to the user's (and/or other user's assigned actions/tasks through the reminder system) calendar in the email system.

Figure 18:
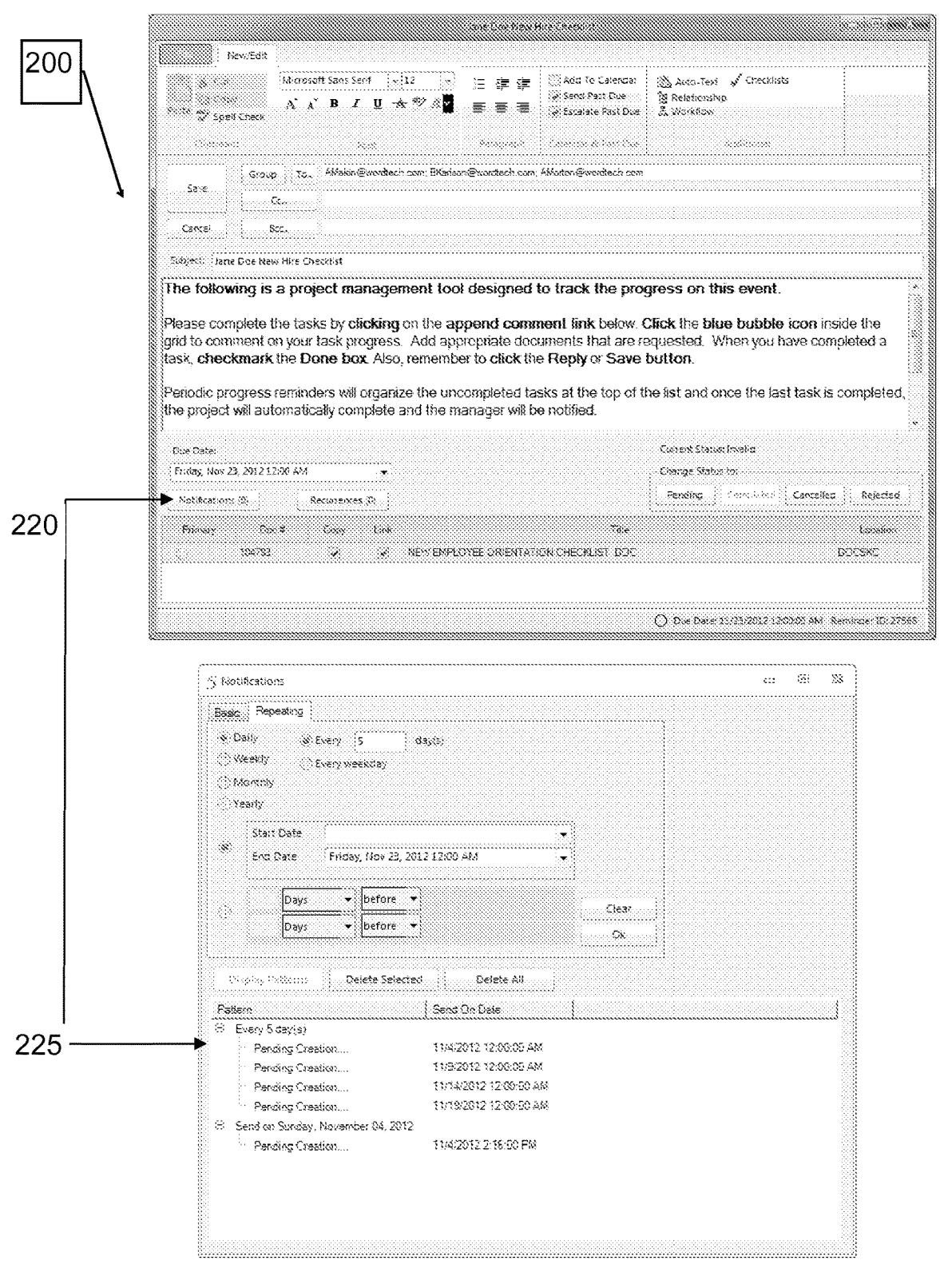

In FIG. 18 the user selects a notifications option input button 220 in reminder 200 which initiates a notifications selection pop-up window 225. The notifications selection pop-up window 225 allows the user to set a pattern of notifications by days before or after due date, repeating daily, weekly, monthly, yearly, with escalations until there is completion. Notifications may be a one-time occurrence (basic) or repeating numerous times up to the deadline and beyond if not completed. The notifications options selected with respect to reminder 200 are saved and stored in a database accessible by the reminder system in association with the reminder ID.

Figure 19:
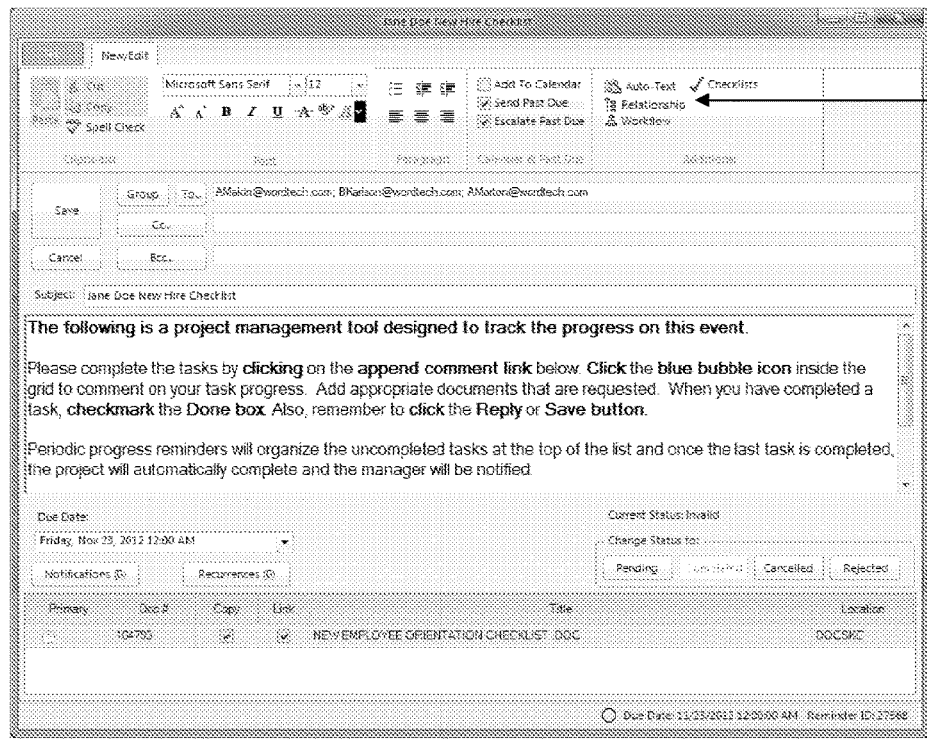
Figure 19:
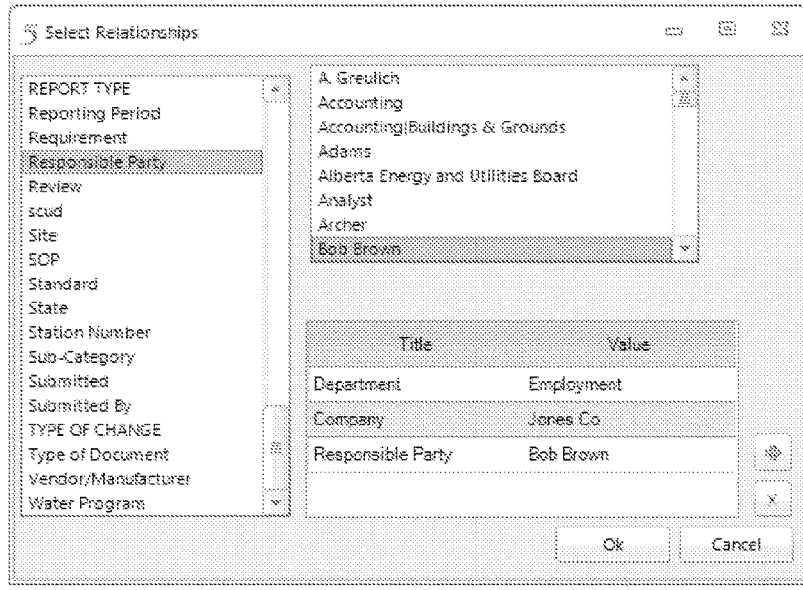

In FIG. 19 the user selects a relationship option input button 230 which initiates a relationship selection pop-up window 235. The relationship window 235 is used to set what the reminder is related to for reference on the email reminder and for organizing reports or sorting of a compliance calendar. It may include a number of preset fields or may be manually entered by the user. The relationship data entered is stored in a database accessible by the reminder system in association with the reminder ID.

Figure 20:
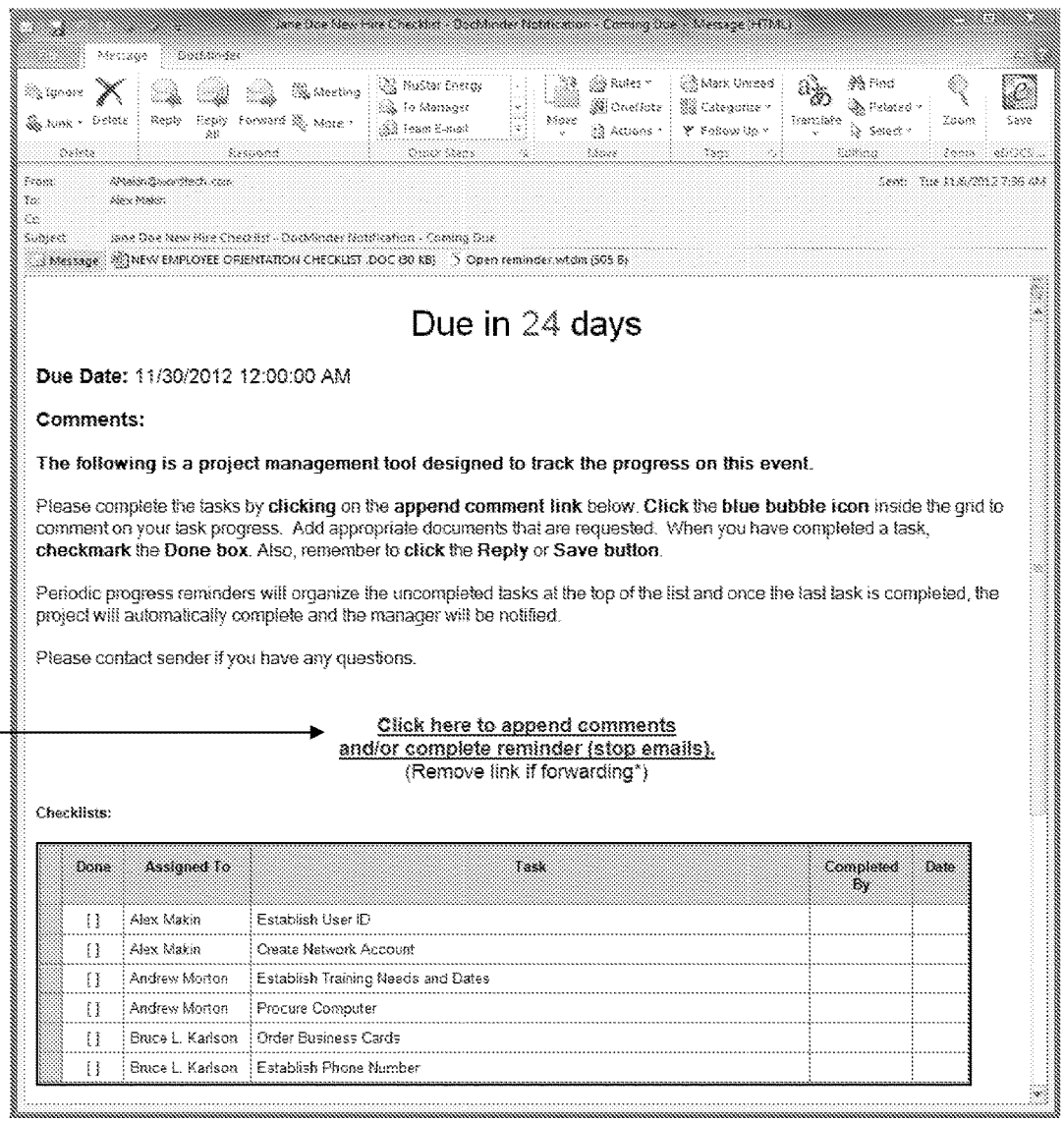

In FIG. 20 a reminder notification 300 goes out to the email inboxes of the recipients (i.e. the individuals assigned tasks in reminder 200). In the embodiment shown in FIG. 20, the reminder is generated and sent by the user's email system via a plug-in. Nevertheless, it will be appreciated that the reminder may be sent via a separate email sever of the reminder system. The reminder notification 300 includes information regarding tasks assigned, the checklist and due date. The reminder notification 300 further includes a link 310 that allows the recipient to post progress information and related documents to the reminder system. The link directs the recipients web browser to a web portal of the reminder system. The recipients also can complete a task, by marking it as completed in the web portal, which logs who completed the task with a timestamp and saves the updated data in the database(s) accessible by the reminder system.

Figure 21:
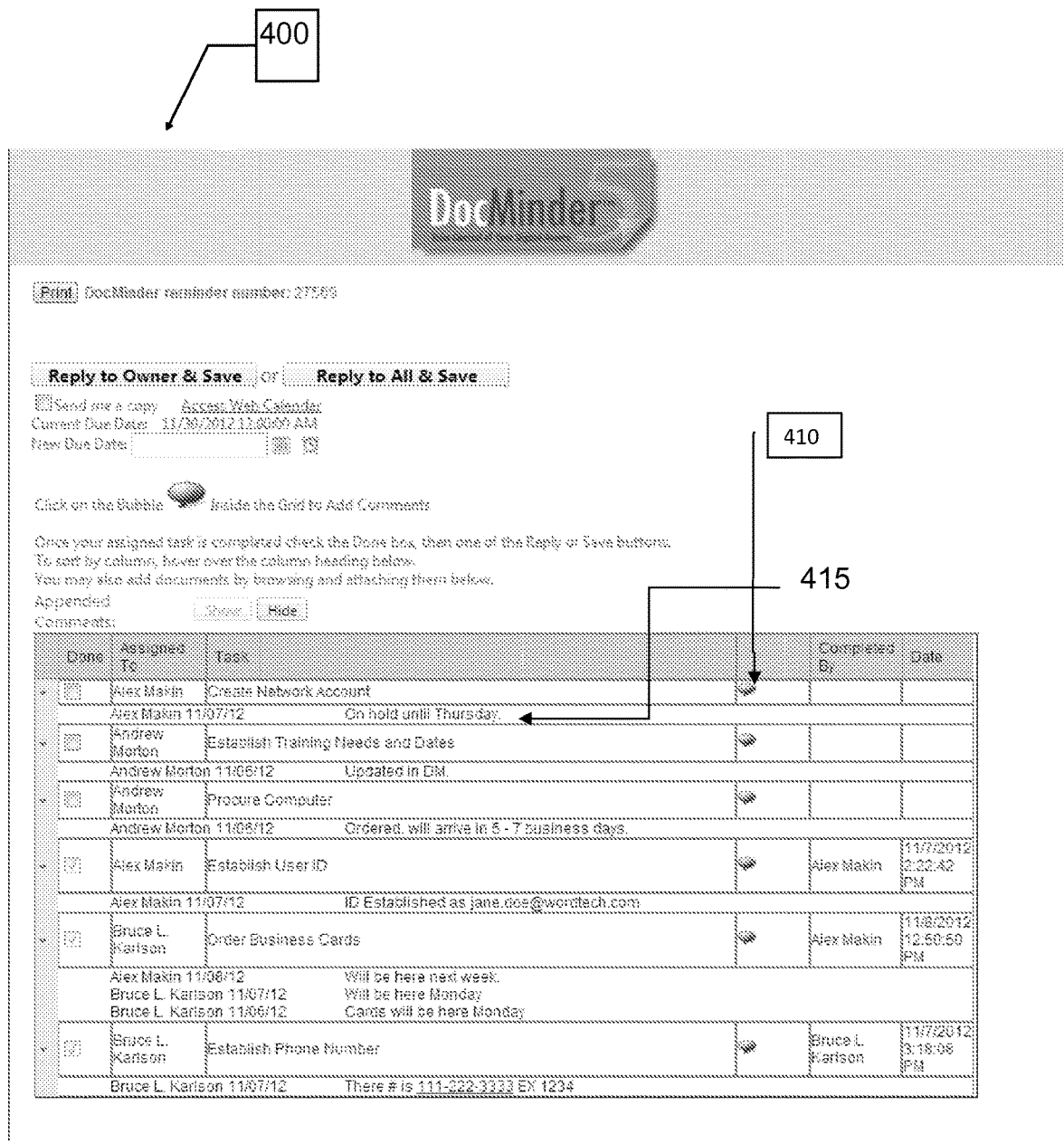
Figure 22:
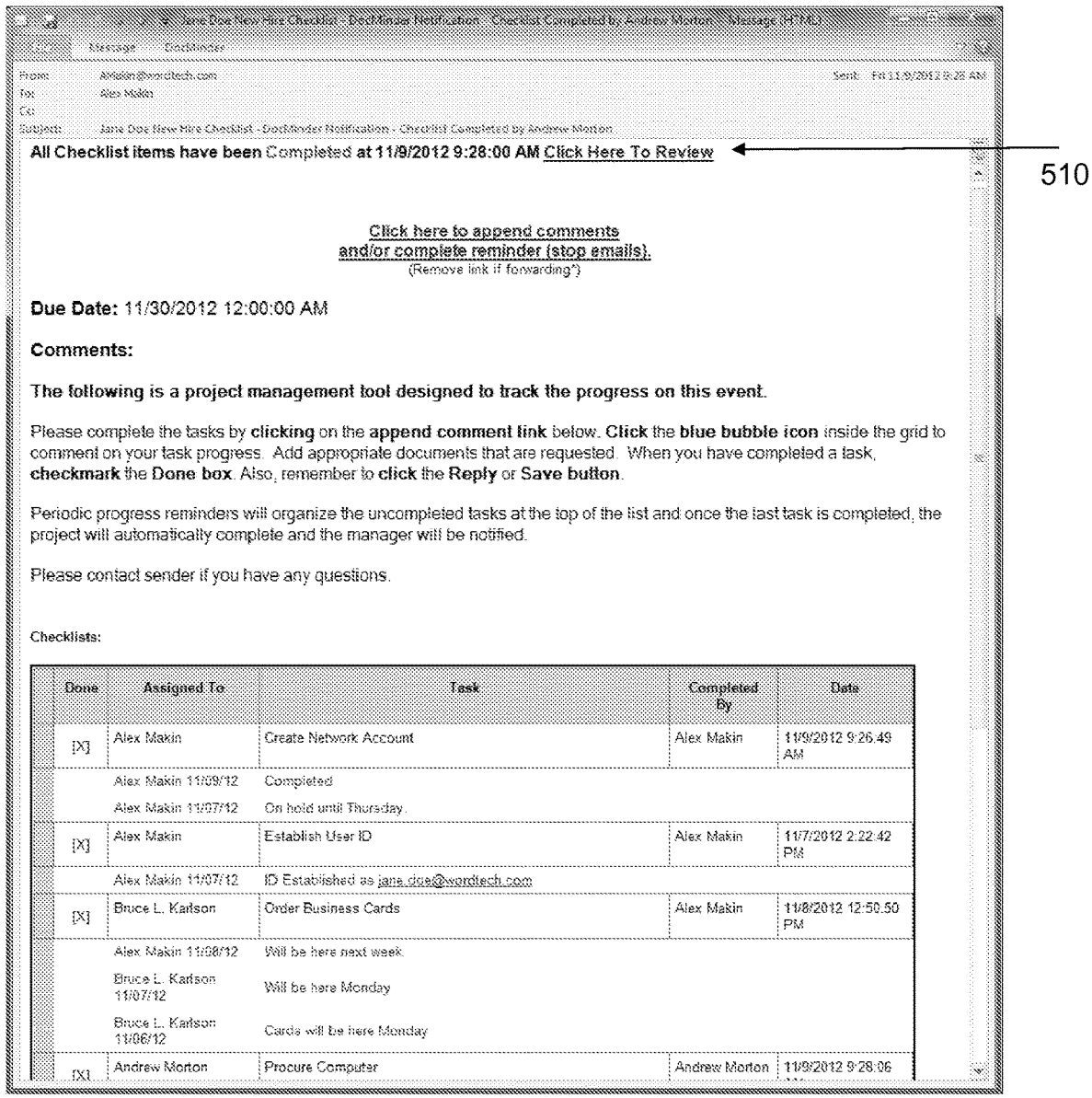

FIG. 21 shows a webpage 400 of the web portal of the reminder system that is specifically associated with reminder 200 and which has been accessed through link 310 of reminder notification 300. As the tasks of the checklist are updated through the portal as completed (by the recipient user selecting the checkmark option input in the "Done" field), the reminder system keeps log of all comments 410 and completed action items in the database(s). Comments 410 are added to the data associated with a task by selecting a comment input bubble 415 on the webpage 400. All data is saved and stored in the database(s) accessible by the reminder system.

Figure 23:
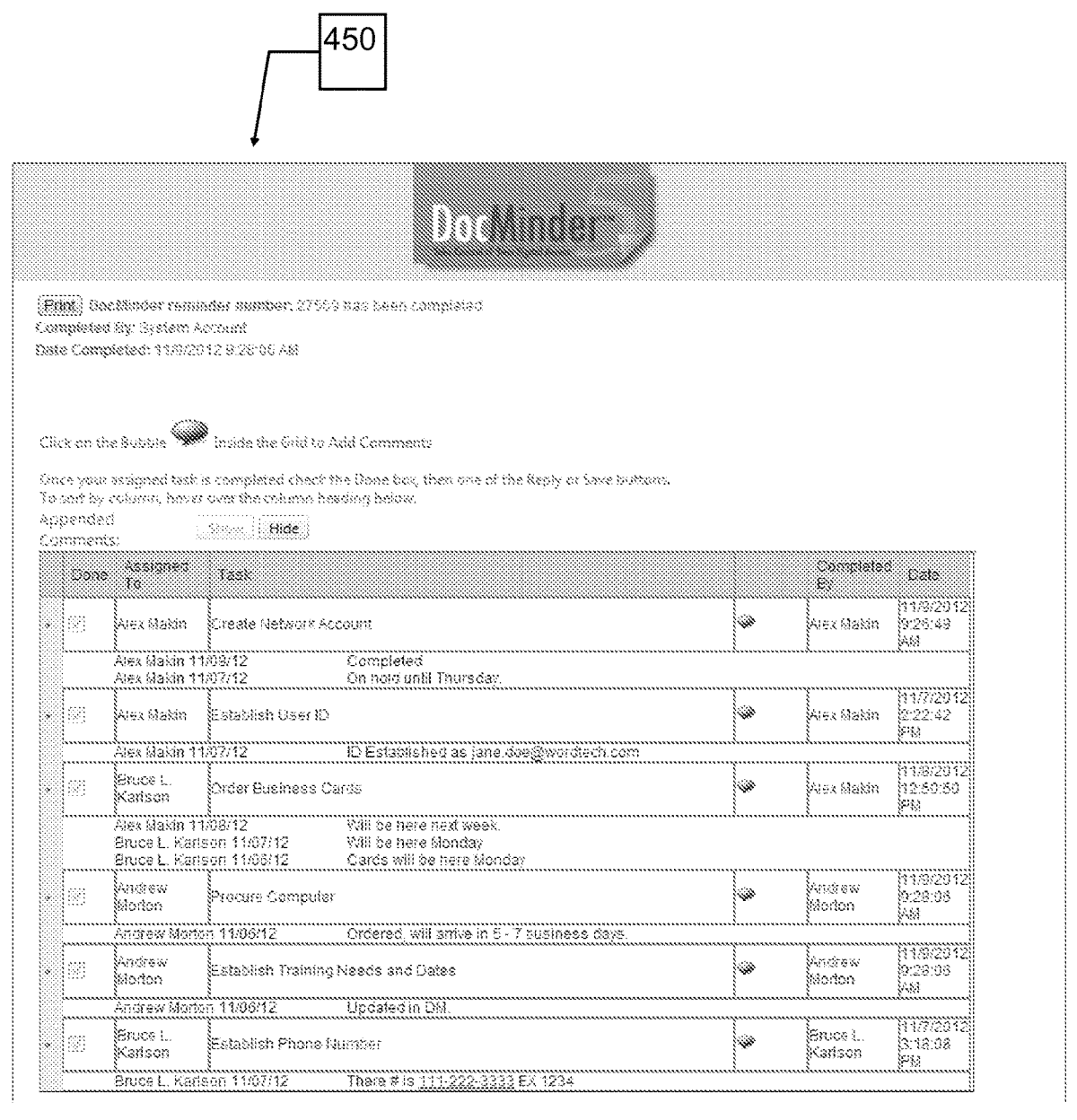

When a checklist item is updated or completed by a recipient user on webpage 400, the Owner of the reminder will get a notification email 500 (see FIG. 22) sent to the owner's email address generated by the reminder system that shows the current project progress/status. In owner notification 500 all tasks of the checklist have been completed. The owner (user) may select link 510 in notification 500 that directs the owner's web browser to the web portal of the reminder system to allow the owner to review the reminder and/or add further comments. In one embodiment, notifications 500 and 300 are generated from templates stored in a database accessible by the reminder system FIG. 23 shows the webpage 450 of the web portal of the reminder system that is specifically associated with reminder 200 and which has been accessed through link 510 of notification 500. The webpage 450 now shows the current project status as completed (i.e. all tasks have been completed) and allows the user to print the completed project for reporting. The user (or any user) can access the web portal through the links provided in the notifications and/or through a direct link or address associated with a user subscription, account, etc.

Figure 24:
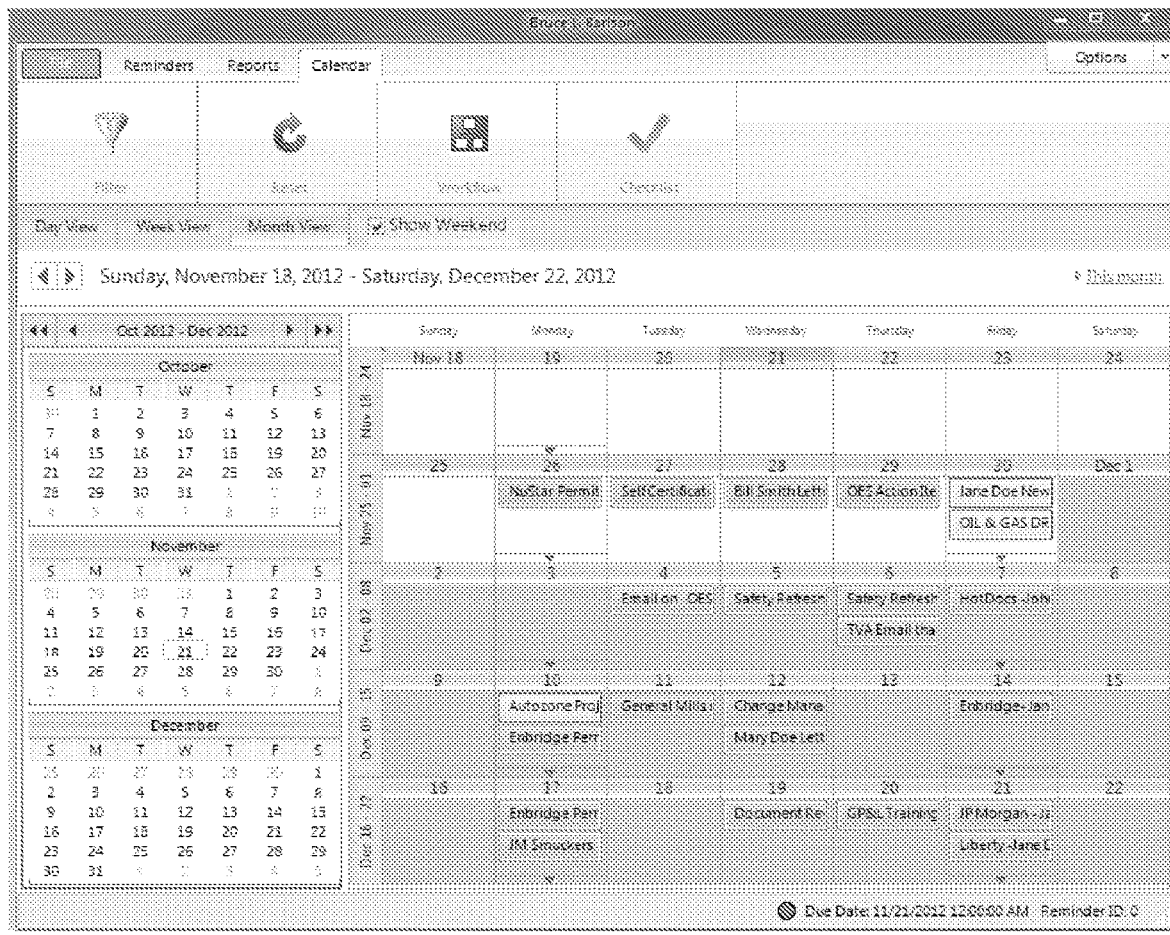
Figure 24:
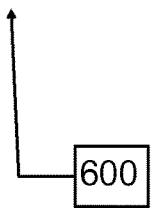

FIG. 24 shows a Compliance Calendar 600 included in the web portal of the reminder system that allows the user to drill down to see who has accomplished what with respect to reminder 200 (or the reminder ID) and with related documents and email conversations. The user can filter the calendar by topic, individuals, departments, etc., and in some embodiments the calendar is color coded based on status.

Figure 25:
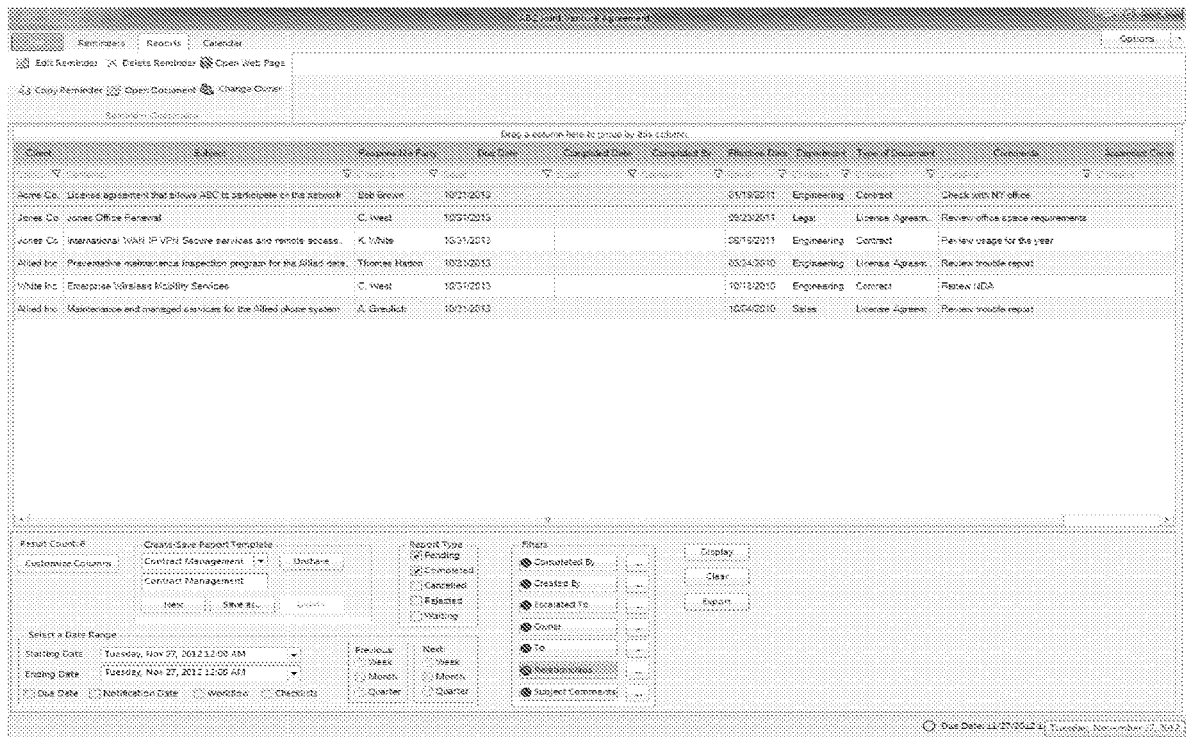

FIG. 25 shows reports 600 included in the web portal of the reminder system. Reports 600 can be customized by the user to select the report columns then specific data, time period, etc., the report should be run on. The user can then drill down to the specific data found above in each project. Also the report can be exported to Excel to send to others.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A workload tracking system comprising:
  a computer program that is encoded on a machine non-transitory readable storage medium in a server, and is accessible by one or more client devices to utilize the functionality of, the computer program including a connection with a calendar system; a central database for storing project information pertaining to a plurality of projects, said project information including status of one or more actions associated with one or more project; and
  an administration interface that is configured to provide the total workload of each system user to a system administrator,
  wherein a plurality of different system users are connected with said calendar system,
    wherein one or more of said plurality of different system users are designated as supervisory user,
  wherein one or more actions relating to certain of said projects are assignable to one or more of said system users by a supervisory user,
    wherein a supervisory user is able to view the status of said one or more actions,
  wherein said computer program updates said status in said database upon receipt of appropriate input from any system user assigned to an action, and wherein said computer program provides to one or more of said system users one or more reminder relating to certain of said actions, said one or more reminder being directly generated by the system based on said project information, wherein said project information is provided by a supervisory user and comprises at least one workload indicator for each of said one or more actions,
  wherein said administration interface is configured to allow the system administrator to reassign one or more actions so as to increase the total workload of one system user while decreasing the total workload of another system user;
  wherein said administration interface is configured to provide the system administrator with an indication of whether a system user will be unavailable to perform one or more action that is assigned to the system user; and wherein the unavailability of the system user is associated with the system user being out of the office for an extended period of time.

2. The system as claimed in claim 1; wherein the unavailability of the system user is associated with the system user having one or more actions assigned to the system user that require more work time than the system user has available prior to a due date of the one or more actions.

3. The system of claim 1 wherein said administration interface is further configured to provide the total workload of a group of system users to a system administrator.

4. The system of claim 3 wherein said administration interface is configured to allow the system administrator to remove one or more system users from the group of system users, said administration interface being further configured to allow the system administrator to reassign all actions of the one or more removed system users to the remaining system users in the group of system users.

5. The system of claim 3 wherein said administration interface is configured to allow the system administrator to add one or more system users to the group of system users, said administration interface being further configured to allow the system administrator to reassign some actions of one or more original system users to the one or more new system users.

6. The system as claimed in claim 1 wherein said project information includes a plurality of options to include information with a calendar event.

7. The system as claimed in claim 1 further including a report generator, wherein project information is sortable by a plurality of fields.

8. A workload tracking system comprising a computer program encoded on a machine non-transitory readable storage medium that accesses: a calendar system;

a database for storing project information pertaining to a plurality of projects, said project information including one or more actions to be taken at certain times; and an administration interface that is configured to provide the total workload of each system user to a system administrator, wherein a plurality of different system users are connected with said calendar system, wherein one or more of said plurality of different system users are designated as supervisory users, wherein one or more actions relating to certain of said projects are assignable to one or more of said system users by a supervisory user, wherein said project information further includes status of said one or more actions, said status being updatable by the computer program upon receipt of appropriate input from any system user assigned to an action, wherein a supervisory user is able to view the status of said one or more actions, wherein one or more of said systems users are provided with one or more reminder relating to certain of said actions, said one or more reminder being directly generated by the system based on said project information, wherein said project information further includes at least one workload indicator for each of said one or more actions, and wherein said administration interface is configured to allow the system administrator to reassign one or more actions so as to increase the total workload of one system user while decreasing the total workload of another system user;

wherein said administration interface is configured to provide the system administrator with an indication of whether a system user will be unavailable to perform one or more action that is assigned to the system user;

and wherein the unavailability of the system user is associated with the system user being out of the office for an extended period of time.

9. The system as claimed in claim 8 wherein said action comprises sending a reminder message via a messaging system.

10. A method of managing a project comprising the steps of: storing project information regarding projects in association with a calendar system computer program, wherein said information includes information for actions to be taken at certain times, and wherein said project information includes status of said actions; generating calendar events by said calendar system associated with certain of a plurality of different system users so as to indicate the times the actions are to be taken, and: wherein said project information is created and assigned by a supervisory user, updating by the computer program the status of an action upon receipt of appropriate input from any system user for which a reminder message is directly generated by the computer program based on said information; and providing said reminder message to the user for which the reminder message is generated, assessing the total workload of one or more system user, and reassigning one or more action from one system user to another system user so as to decrease the workload of the one system user while increasing the workload of the other system user;

wherein said administration interface is configured to provide the system administrator with an indication of whether a system user will be unavailable to perform one or more action that is assigned to the system user; and wherein the unavailability of the system user is associated with the system user being out of the office for an extended period of time.

11. The method as claimed in claim 10 further comprising assessing the total workload of a group of system users.

12. The method as claimed in claim 11 further comprising removing one or more system users from a group of system users and reassigning actions from the one or more removed system users to the remaining system users in the group.

13. The method as claimed in claim 12 further comprising adding one or more system users to a group of system users and reassigning some actions from one or more original system users to the one or more new system users.

* * * * *

UNITED STATES PATENT AND TRADEMARK OFFICE
CERTIFICATE OF CORRECTION

| | |
|---|---|
| PATENT NO. | : 11,763,227 B2 |
| APPLICATION NO. | : 15/785102 |
| DATED | : September 19, 2023 |
| INVENTOR(S) | : Karlson |

It is certified that error appears in the above-identified patent and that said Letters Patent is hereby corrected as shown below:

In the Drawings

Figure 14:
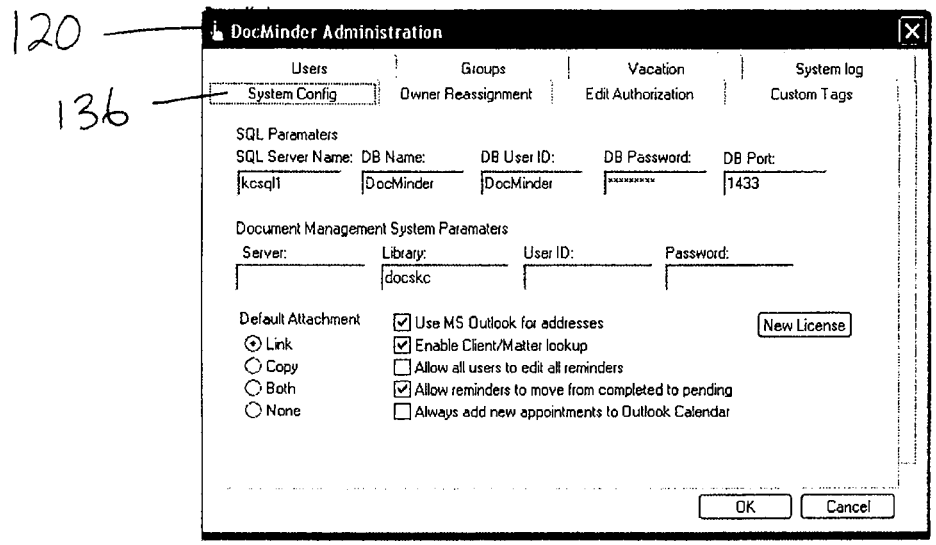
FIG. 14 is a sample screen shot of the administrating feature of FIG. 7 showing a system configuration feature.
Figure 15:
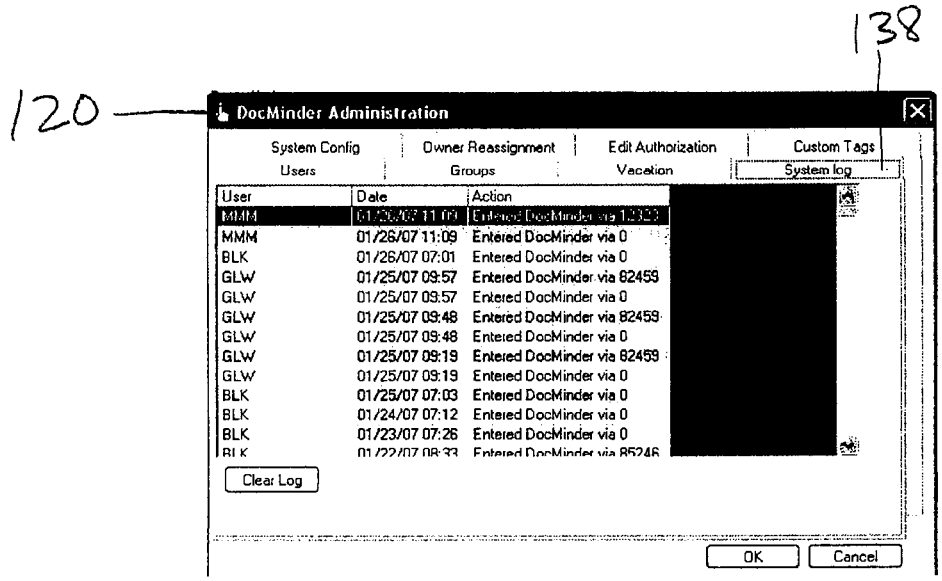
FIG. 15 is a sample screen shot of the administrating feature of FIG. 7 showing a system log.

On Sheet 12 of 22, FIG. 14, Tag 120, Line 3, delete "Paramaters" and insert -- Parameters --, therefor.

In the Specification

In Column 15, Line 43, delete "assigner" and insert -- assignor --, therefor.

In Column 18, Line 5, delete "with in" and insert -- within --, therefor.

In the Claims

In Column 18, Claim 1, Line 50, after "action," delete "and".

Signed and Sealed this
Seventh Day of November, 2023

*Katherine Kelly Vidal*

Katherine Kelly Vidal
*Director of the United States Patent and Trademark Office*